(12) United States Patent
Cassellia et al.

(10) Patent No.: US 8,141,948 B2
(45) Date of Patent: Mar. 27, 2012

(54) SEAT BACK ENTERTAINMENT SYSTEM

(75) Inventors: James Cassellia, Huntington Station, NY (US); Edward Capapano, Farmingdale, NY (US); William Cowles, Brooklyn, NY (US); Jean-Jacques L'Henaff, Pelham, NY (US); Theodore W. Koontz, III, Miller Place, NY (US); Jeffrey Macholz, Patchogue, NY (US); Michael J. Paladino, Manhasset Hills, NY (US)

(73) Assignee: Audiovox Corporation, Hauppauge, NY (US)

( * ) Notice: Subject to any disclaimer, the term of this patent is extended or adjusted under 35 U.S.C. 154(b) by 455 days.

(21) Appl. No.: 12/117,519

(22) Filed: May 8, 2008

(65) Prior Publication Data

US 2009/0013357 A1    Jan. 8, 2009

Related U.S. Application Data

(60) Provisional application No. 60/917,440, filed on May 11, 2007.

(51) Int. Cl.
*A47C 7/62* (2006.01)
(52) U.S. Cl. .................. 297/217.3; 297/188.04
(58) Field of Classification Search ............... 297/217.3, 297/188.04, 283.3, 223
See application file for complete search history.

(56) References Cited

U.S. PATENT DOCUMENTS

| | | | |
|---|---|---|---|
| 4,756,528 A * | 7/1988 | Umashankar | 463/1 |
| 4,982,996 A | 1/1991 | Vottero-Fin et al. | |
| 5,267,775 A | 12/1993 | Nguyen | |
| 5,311,302 A | 5/1994 | Berry et al. | |
| 5,359,349 A | 10/1994 | Jambor et al. | |
| 5,410,447 A | 4/1995 | Miyagawa et al. | |
| 5,842,715 A | 12/1998 | Jones | |
| 6,081,420 A | 6/2000 | Kim et al. | |
| 6,199,948 B1 * | 3/2001 | Bush et al. | 297/217.3 |
| 6,241,188 B1 | 6/2001 | Simpson et al. | |
| 6,266,236 B1 | 6/2001 | Ku et al. | |
| 6,292,236 B1 | 9/2001 | Rosen | |
| 6,409,242 B1 | 6/2002 | Chang | |
| 6,665,163 B2 | 12/2003 | Yanagisawa | |
| 6,871,356 B2 | 3/2005 | Chang | |
| 6,899,365 B2 | 5/2005 | Lavelle et al. | |
| 7,040,699 B2 | 5/2006 | Curran et al. | |
| 7,084,932 B1 | 8/2006 | Mathias et al. | |
| 7,510,241 B2 * | 3/2009 | Nathan et al. | 297/217.3 |
| 7,611,198 B2 * | 11/2009 | Schweizer | 297/217.3 |

(Continued)

FOREIGN PATENT DOCUMENTS

DE    10 2005 051 138    5/2007

(Continued)

OTHER PUBLICATIONS

International Search Report.

(Continued)

*Primary Examiner* — Sarah B McPartlin
(74) *Attorney, Agent, or Firm* — F. Chau & Associates, LLC

(57) ABSTRACT

A seat back entertainment system includes a seat panel connected to a frame of a vehicle seat. A video unit provides a video signal. A display device is mounted to the seat panel. The display device displays the video signal provided by the video unit. One or more compartments formed in the seat panel.

18 Claims, 27 Drawing Sheets

U.S. PATENT DOCUMENTS

| | | | |
|---|---|---|---|
| 2004/0086259 A1 | 5/2004 | Schedivy | |
| 2004/0227695 A1 | 11/2004 | Schedivy | |
| 2004/0239155 A1* | 12/2004 | Fourrey et al. | 297/163 |
| 2005/0052046 A1 | 3/2005 | Lavelle et al. | |
| 2005/0098593 A1 | 5/2005 | Schedivy | |
| 2005/0110310 A1* | 5/2005 | Mayer et al. | 297/188.06 |
| 2005/0140845 A1 | 6/2005 | Huang | |
| 2005/0146844 A1 | 7/2005 | Hussaini et al. | |
| 2005/0242636 A1* | 11/2005 | Vitito | 297/217.3 |
| 2006/0288377 A1* | 12/2006 | Hsieh | 725/76 |
| 2007/0052618 A1 | 3/2007 | Shalam | |
| 2007/0290536 A1 | 12/2007 | Nathan et al. | |
| 2008/0238169 A1* | 10/2008 | Hicks et al. | 297/353 |

FOREIGN PATENT DOCUMENTS

| | | |
|---|---|---|
| DE | 10 2006 035 998 | 2/2008 |
| EP | 1 502 810 A2 | 2/2002 |
| EP | 1721 784 | 11/2006 |
| WO | WO 00/07847 | 2/2000 |
| WO | WO 00/38951 | 7/2000 |
| WO | WO 2005/038628 | 4/2005 |
| WO | WO 2007/030638 | 3/2007 |

OTHER PUBLICATIONS

International Search Report dated May 22, 2007.
Extended European Search Report dated Jun. 24, 2010.

* cited by examiner

SEAT BACK ENTERTAINMENT SYSTEM

CROSS-REFERENCE TO RELATED APPLICATION

The present application is based on provisional application Ser. No. 60/917,440 filed May 11, 2007, the entire contents of which are herein incorporated by reference.

BACKGROUND OF THE INVENTION

1. Technical Field

The present disclosure relates to an entertainment system and, more specifically, to a seatback entertainment system.

2. Discussion of Related Art

Today, vehicle entertainment systems are a desirable feature, especially for family automobiles such as sedans SUVs, and minivans where children may be likely passengers. However, the most desirable vehicle entertainment systems are often only available as costly factory options. While less expensive after-market products are available, some of these products may adapt to the automobile in an awkward and unsightly manner that may interfere with the proper function of vehicle components such as vehicle seat headrests.

Moreover, some of these after-market products, if not properly configured, may become unfastened in the event of a vehicle collision and may inadvertently become dangerous projectiles.

Moreover, today's vehicle entertainment systems, both factory-installed and aftermarket often consist of a small display and a DVD player. Thus, there is a need for a cost-effective and versatile vehicle entertainment system with a great number of desirable features.

SUMMARY

A seat back entertainment system includes a seat panel connected to a frame of a vehicle seat. A video unit provides a video signal. A display device is mounted to the seat panel. The display device displays the video signal provided by the video unit. One or more compartments formed in the seat panel.

The seat panel may be vehicle-specific for connecting to a particular vehicle model. The seat panel may connect to the frame of the vehicle seat after an original seat back panel has been removed from the vehicle seat. The video unit may include connectors for receiving video input from an external media player. The video unit may include a personal media player (PMP) dock for receiving a PMP and communicating a video signal from the PMP to the display device.

The video unit may include a media player. The media player may be an optical disc playback device. The media player may include one or more ports for receiving media stored on an external USB device or a memory card.

The one or more moldings or containment areas may include one or more pockets or nettings. The display device may fold down or slide into the seat panel when not in use. The display device may be rotatably mounted to the seat panel.

A method for installing a seatback entertainment system includes removing an original seat back panel from a vehicle seat and exposing a frame of the vehicle seat. An entertainment system seat panel is attached to the exposed frame of the vehicle seat. The entertainment system seat panel includes a video unit for providing a video signal, a display device mounted to the entertainment system seat panel, and one or more compartments formed in the entertainment system panel. The display device displays the video signal provided by the video unit.

The entertainment system seat panel may be selected from a plurality of available entertainment system seat panels according to a model of the vehicle. The video unit may include connectors for receiving video input from an external media player. The video unit may include a personal media player (PMP) dock for receiving a PMP and communicating a video signal from the PMP to the display device.

The display device may fold down or slide into the seat panel when not in use. The display device may be rotatably mounted to the seat panel.

A vehicle seat panel for connecting a seat back entertainment system to a vehicle seat includes a rotatable hinge connects to a display device. A cavity houses a video unit for providing a video signal to the display device. One or more compartments are formed in the seat panel.

The seat panel may be vehicle-specific for connecting to a particular vehicle model. The seat panel may connect to the frame of the vehicle seat after an original seat back panel has been removed from the vehicle seat.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
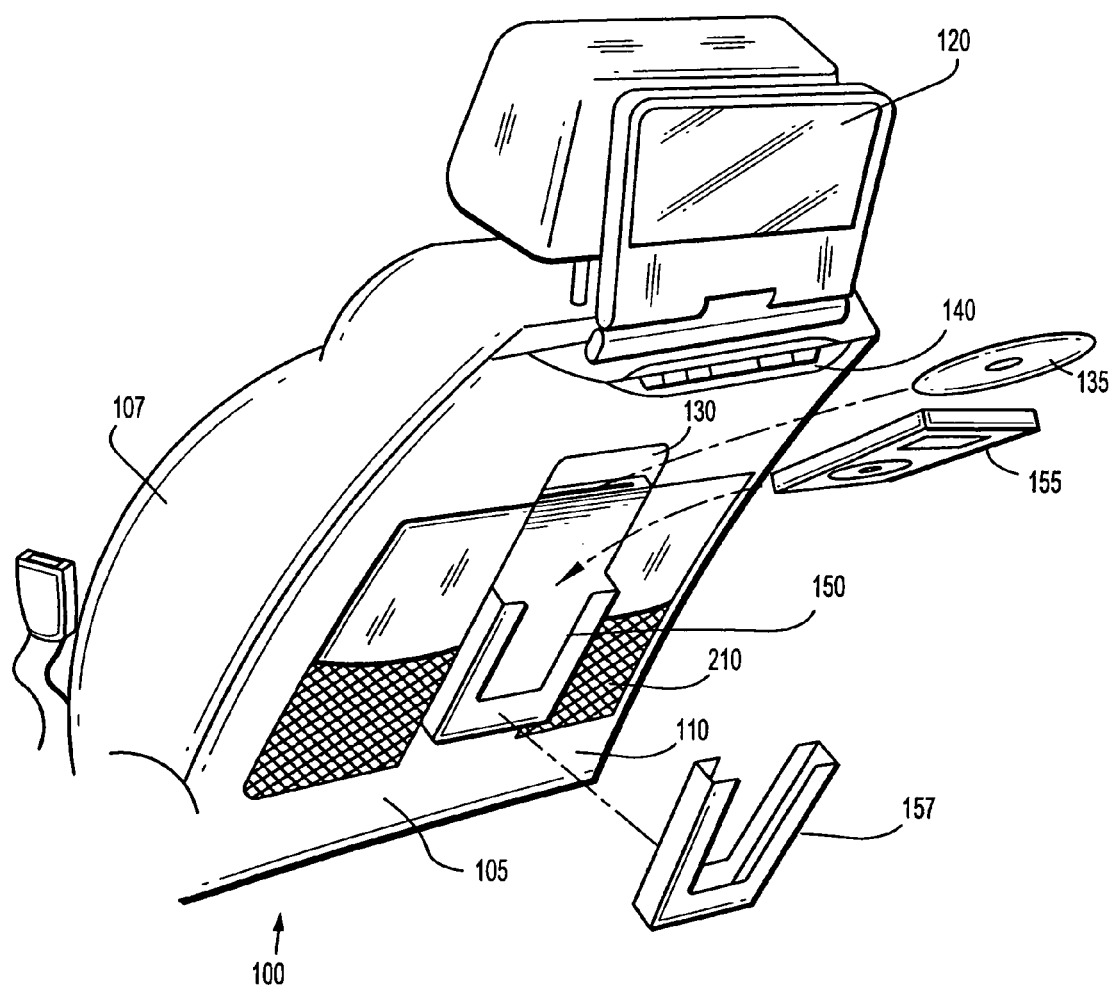
FIG. 1 shows an entertainment system according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide a vehicle entertainment system that may be either factory installed or distributed as an aftermarket accessory. Exemplary embodiments of the present invention may be capable of being mounted in a seat of a vehicle. Preferably, the entertainment system includes a vehicle seat panel that may be attached to the back of a vehicle seat. The vehicle seat panel includes various moldings, cutouts and containment areas for the neat and efficient storage of one or more entertainment system elements, accessories and peripherals. The vehicle seat panel may also include a stow-away display system. The display system may retract from and/or fold into the seat panel for optimal display orientation and protected storage. The entertainment system may include a built-in media player such as an optical disc player for the playing of DVD movies and CD audio. The entertainment system may also include an interface for a removable media player such as a dock for a personal media player (PMP). An example of a suitable PMP is the iPod™ offered by Apple, Inc.

FIGS. 1-28 are diagrams showing entertainment systems incorporated into vehicle seat panels according to various exemplary embodiments of the present invention.

FIG. 1 shows an entertainment system 100 according to an exemplary embodiment of the present invention. The entertainment system 100 may be mounted within and/or upon a vehicle seat panel 105. The vehicle seat panel 105 may interface with a vehicle seat 107, for example, a front seat of a passenger vehicle. The vehicle seat panel 105 may be removable or may be permanently affixed to the vehicle seat 107.

The vehicle seat panel 105 may be formed to replace an original equipment seat panel that may be removed from the vehicle seat prior to installation of the entertainment system. Alternatively, the vehicle seat panel 105 may be formed to attach over the original equipment seat panel.

The vehicle seat panel 105 may be custom designed for one or more vehicle models. The entertainment system may therefore include a vehicle seat panel 105 that is compatible with the particular vehicle model that the entertainment system is to be installed to. According to some exemplary embodiments of the present invention, other elements of the entertainment system may be usable regardless of the particular vehicle model. Having a vehicle seat panel 105 that is model-specific and other elements that are unspecific allows for greater compatibility while minimizing the number of parts that must be optimized for a particular vehicle model. Accordingly, entertainment systems according to an exemplary embodiment of the present invention may be sold as a kit including a model-specific vehicle seat panel 105 along with a set of unspecific elements.

Thus the entertainment system according to an exemplary embodiment of the present invention may be applicable to all types of vehicle seats including front and rear seats, particularly for vehicles having more than one row of passenger seats. The entertainment system affixes to the seat back rather than the headrest and does not interfere with movement of the headrest. Exemplary embodiments are particularly suitable for vehicle seats including active headrests, but are well suited for vehicle seats not including active headrests.

The vehicle seat panel 105 may have any number of moldings, cutouts and containment areas for the neat and efficient storage of one or more entertainment system elements, accessories and peripherals. For example, one or more nettings 210 may be used for the storage of various items. The nettings 210 may be formed flush with the outer surface of the seat panel or may be formed in cooperation with a recessed pocket to allow for the storage of larger items. Cutouts may be formed on the outer surface of the seat panel to receive items. Clips, latches and various other attachment mechanisms may be used alone or in combination with seat panel cutouts and recesses to help secure items to the seat panel in a neat and secure way.

The entertainment system may include a built-in media player such as an optical disc player 130 for the playing of removable media such as DVD movies and CD audio 135. Media players may also include previous generation media players such as VCRs and/or next-generation media players such as Blu-ray Disc™ players and/or HD-DVD™ players. Any other form of media player may be used to read any form of optical discs (pressed or rewritable), flash memory cards such as SD cards, ROM cartridges, magnetic media or any combination thereof.

According to some exemplary embodiments of the present invention, the media player may be replaced by or augmented with such devices as video game consoles, personal computers, satellite television receivers and the like.

The media player 130 may accept removable media 135. To accept removable media 135, the media player 130 may be slot-loading, tray loading or memory card accepting. There may also be one or more USB connectors for receiving portable hard disk drives and/or solid state memory devices such as flash drives.

To conserve space within the seat panel, the media player 130 may be oriented vertically or nearly vertically. However, other orientations are contemplated. For example, the media player may be front-loading or side loading.

The media player may also incorporate solid state memory and/or a hard disk drive for permitting the contents of removable media to be stored within the media player even after the media has been removed. The media player may also include, or be connected to, a multi-disc changer for receiving multiple discs.

In addition to, or instead of a media player for receiving removable media, attachments and/or docking stations within the seat panel may accept a portable media player (PMP) 155 such as an iPod. For example, a PMP dock 150 may be incorporated into the seat panel. The PMP dock 150 may be molded to accommodate a particular model of PMP 155 or may be flexible to accommodate PMPs 155 of various sizes. A PMP-specific insert 157 may also be used to adapt the entertainment system for a particular PMP. Accordingly, the entertainment system may be adapted to receive PMPs of various makes and models using one or more inserts 157 that may be included with the entertainment system or may be offered as optional accessories. The PMP dock may include, for example, in a base thereof, pin connectors to mate with corresponding pin connectors on the PMP to connect the PMP to the entertainment system. In another embodiment, the PMP can be connected to the entertainment system via a port on the entertainment system and a plug-in pin connector extending from the PMP on a wire.

In addition to, or instead of a PMP dock, the entertainment system may include connectors for accepting various other electronic devices such as portable computers, portable gaming consoles, portable satellite radio and/or television receivers, portable optical media players, or any other sort of personal electronic devices. Examples of suitable connectors may include a coaxial RF connector, composite connectors, component connectors, VGA connectors, DVI connectors and/or HDMI connectors.

The seat panel may be wired for directing audio and/or video signals from the media player 130, PMP dock 150, or any other connected device to an integrated display 120. The integrated display 120 may fold-out and/or slide out of the seat panel and may be tiltable and/or rotateable along multiple axes to allow for optimal viewing by passengers of various heights including small children and adults, for example, passengers sitting directly behind the vehicle seat incorporating the entertainment system. The movement in the display 120 may also allow for comfortable viewing by other vehicle passengers.

The display may utilize flat-panel display technologies such as LCD, LED, OLED, ePaper, and/or plasma display to conserve space and allow for the seat panel to accommodate the display in the manners described herein. However, the display is not limited to flat-panel technologies and conventional CRT display and projection technologies may also be used.

The display 120 may be controlled by a display controller unit (not shown) that may be incorporated into the display unit 120 or elsewhere within the entertainment system 100. The display 120 may be a touch screen display for accepting user input for the control of the entertainment system 100 or a feature thereof such as, for example, the media player 130 and/or the PMP 155. Where the display 120 is a touch screen display, a touch screen controller (not shown) may be included within the display unit 120 or elsewhere within the entertainment system 100 for the proper control of the touch screen.

The display 120 may be able to rotate and/or extend about multiple axes. For example, the display 120 may extend and retract, flip forward and back, rotate side-to-side to face any passenger and may even rotate in a clockwise or counter-clockwise manner to change between a landscape and portrait orientation.

Multi-axis rotation may allow for comfortable viewing and may also allow for safely stowing the display 120 when not in use. Stowing may be achieved by flipping the screen forward to close and/or sliding the screen down. Alternatively the screen may slide out of the side of the seat back. When in use, the fully extended display 120 may be adjusted to stand fully vertical or angled either forward or backward of vertical to allow for convenient viewing by passengers of various sizes. Rotation of the display 120 can be achieved by a hinge mechanism, such as, for example, a friction mechanism, which allows for fixing the display at various angles.

Multi-axis rotation may also provide for the safe stowing of a widescreen display by allowing the display to stow when in portrait orientation and then rotate to allow for viewing in landscape orientation. In this way, a widescreen display having an extended width may be safely stowed within the seat panel even when the width of the display approaches or exceeds the width of the seat panel.

A control panel 140 for controlling the media player 130, the display 120, the PMP 155 and/or other entertainment system features may be incorporated into the seat panel. The control panel 140 may be situated such that it is protected by the display when the display is in a closed position. Alternatively, the control panel 140 may remain accessible even when the display is stowed. The control panel may be fixed or detachable. A detachable control panel may be used as a remote control. Alternatively, there may be both a fixed control panel and a separate remote control. The remote control may be able to communicate with the entertainment system using infrared light and/or radio signal. Alternatively, the remote control may be wired. The remote control may be used to control any entertainment system function, for example, it may be used to control the PMP.

Figure 2:
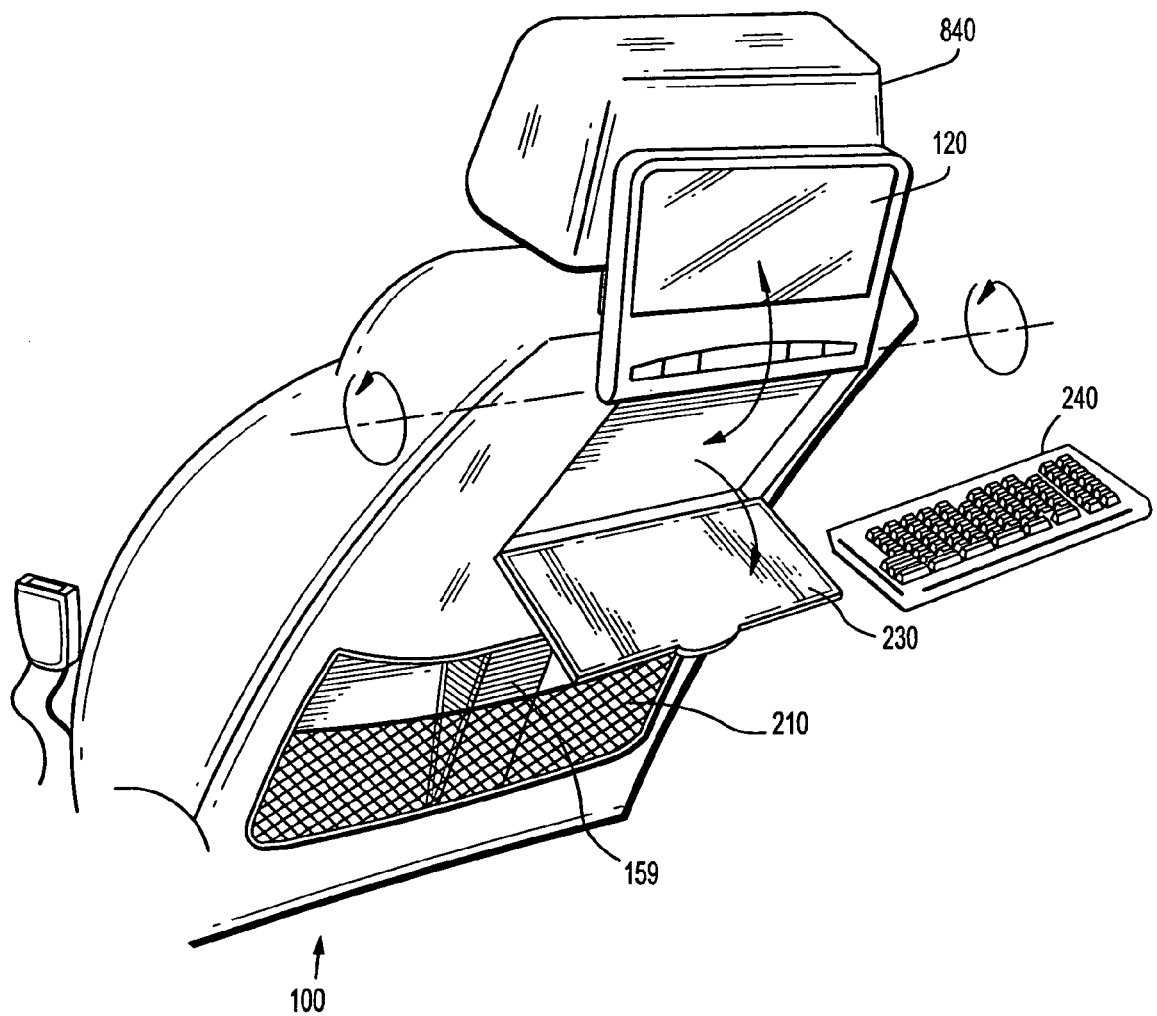
FIG. 2 shows an entertainment system according to an exemplary embodiment of the present invention.

FIG. 2 shows an entertainment system 100 according to an exemplary embodiment of the present invention. The PMP dock 150 may open and close to accept and lock down the PMP. For example, the PMP dock 150 may push open and closed. Alternatively, the PMP dock may be immobile. Having an immobile PMP dock may help to reduce manufacturing costs and improve durability while having a push-out PMP dock may facilitate PMP docking. A PMP dock door 159 may be used to conceal the PMP and/or the PMP dock and improve the overall neatness and visual appeal of the entertainment system. The PMP dock door may push open.

The entertainment system 100 may additionally include a keyboard 240 that may be stowed in a seat panel compartment 230. The seat panel compartment 230 may have a door for securing the keyboard 240 when not in use. The keyboard 240 may be either wired or wireless. For example, the keyboard may use Bluetooth wireless connectivity. The keyboard 240 may be especially useful when a portable computer is integrated into the entertainment system 100. Such a portable computer may connect to a mobile network to allow for internet connectivity, for example using an EV-DO or UMTS data network such as those offered by Sprint and AT&T Mobility respectively. The keyboard 240 may have an integrated pointing device such as a touchpad, trackball or a joystick. Alternatively, a separate pointing device may be used.

The keyboard compartment 230 and the display 120 may fold over one another into a shared cutout, as seen in FIG. 2. The keyboard compartment door may also function as a table surface for supporting the keyboard while typing. The display 120 may rotate from the folded down position to a viewing position, for example, with a range of motion that may be greater than 200°.

The display 120 may flip up from the cutout. As discussed above, the display 120 may adjust to any desired angle and may be held in place by friction forces. For example, the display 120 may flip up less than 180° to provide for comfortable viewing by a small child. The display may also flip up greater than 180°, for example, by 200°, to provide for comfortable viewing by an adult. The maximum flip up angle of the display may be determined by the angle at which the display 120 contacts the vehicle seat headrest 840 or an edge of the vehicle seat.

Figure 3:
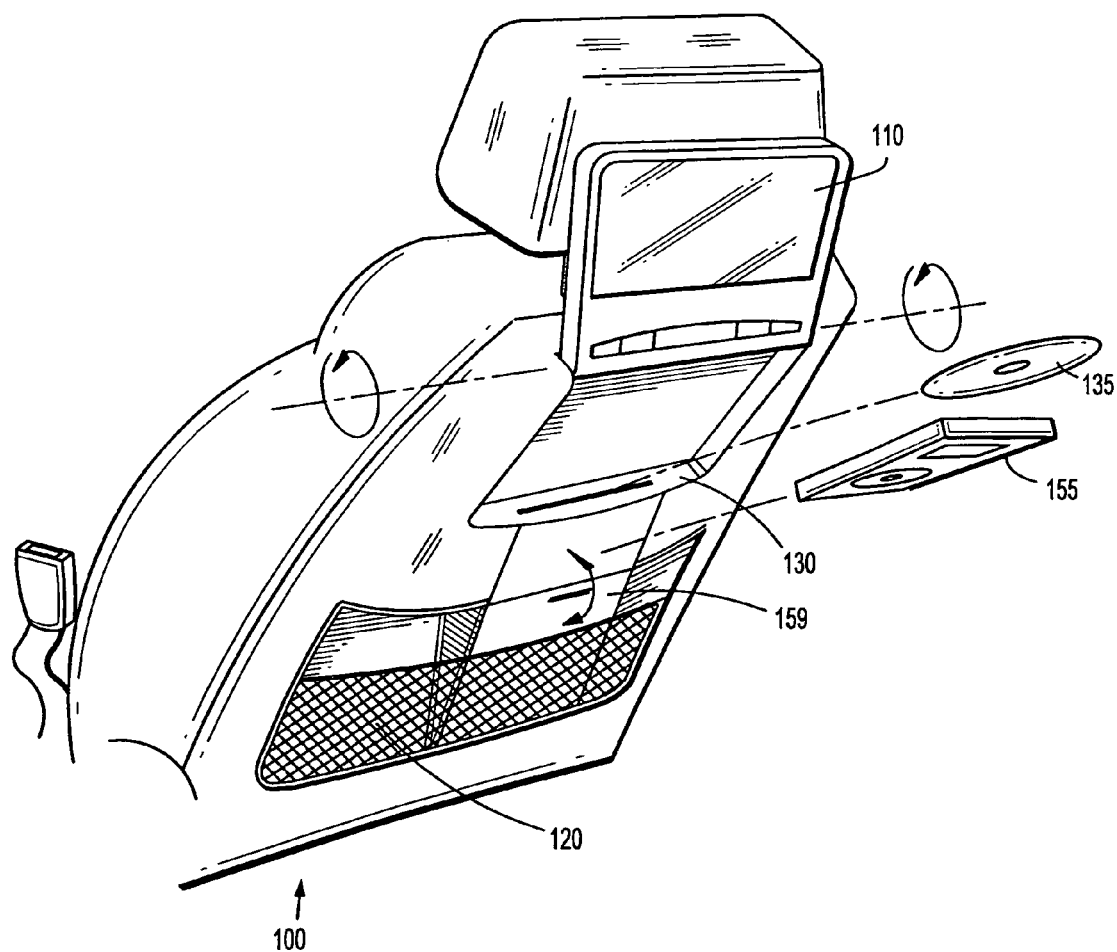
FIG. 3 shows an entertainment system according to an exemplary embodiment of the present invention.

In an exemplary embodiment shown in FIG. 3, the media player 130 may be located below the cutout for the display 120. Accordingly, when the display 120 is flipped up, a disc 135 may be easily inserted into the media player 130 utilizing the space of the cutout. Further, the media player 130 can be protected when the display 120 is in the stowed position.

Figure 4:
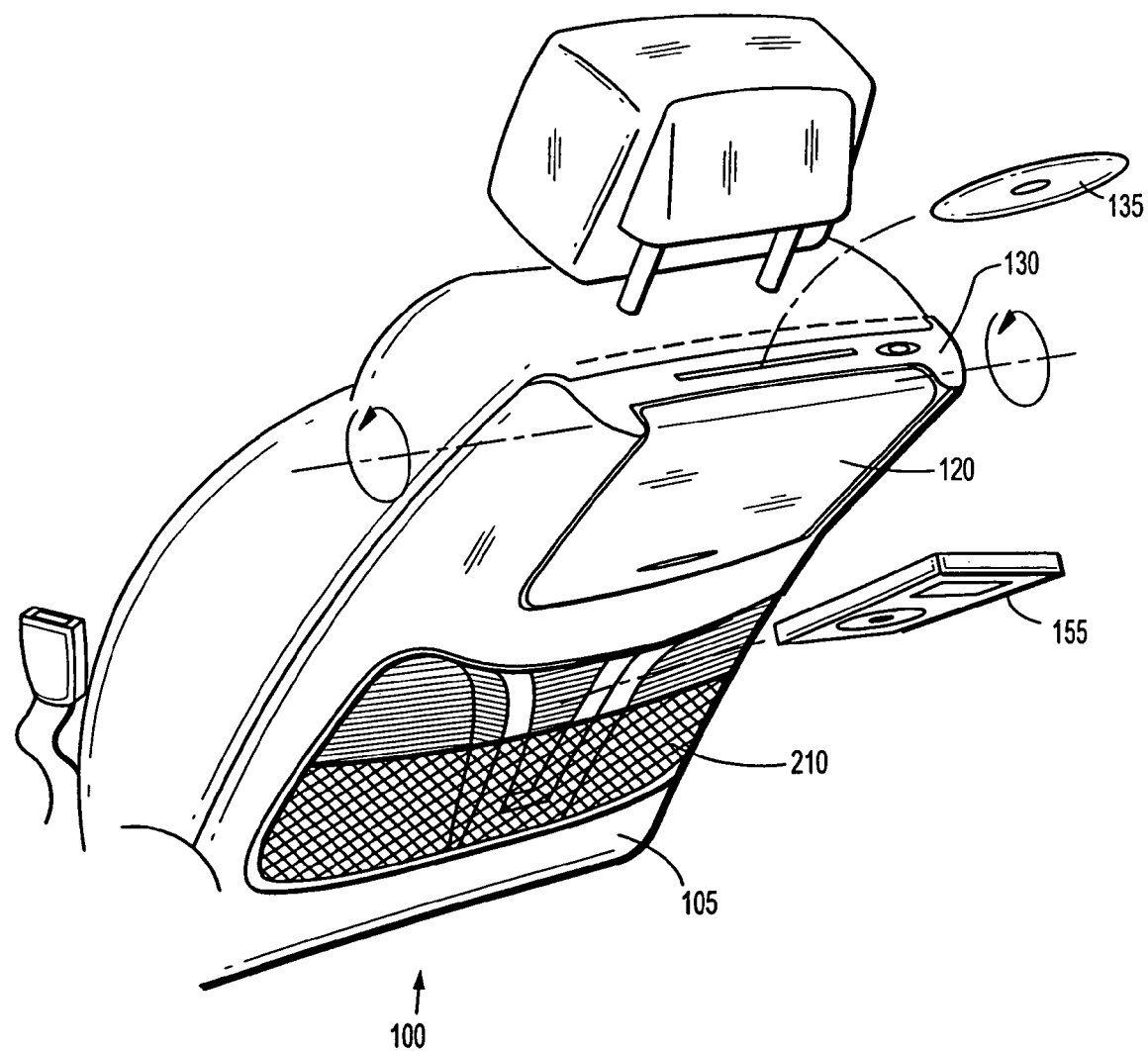
FIG. 4 shows an entertainment system according to an exemplary embodiment of the present invention.

Alternatively, as seen in FIG. 4, the media player 130 may be located behind the display 120. Accordingly, when the display 120 is flipped down, a disc 135 may be easily inserted into the media player 130 utilizing the space above the vehicle seat panel 105.

Alternatively, the media player 130 and/or the PMP dock 150 may be incorporated within the display unit 120.

According to an exemplary embodiment, a media player 130 loader may push out to allow for disc 135 loading and may push in to allow for disc 135 playback. The loader may be jointed at its bottom to allow it to pivot outwards to accept a disc 135. The media player 130 loader may push out until a maximum travel has been achieved. According to one exemplary embodiment, the loader may have a maximum travel of 1 inch and may be pushed to open.

Figure 5:
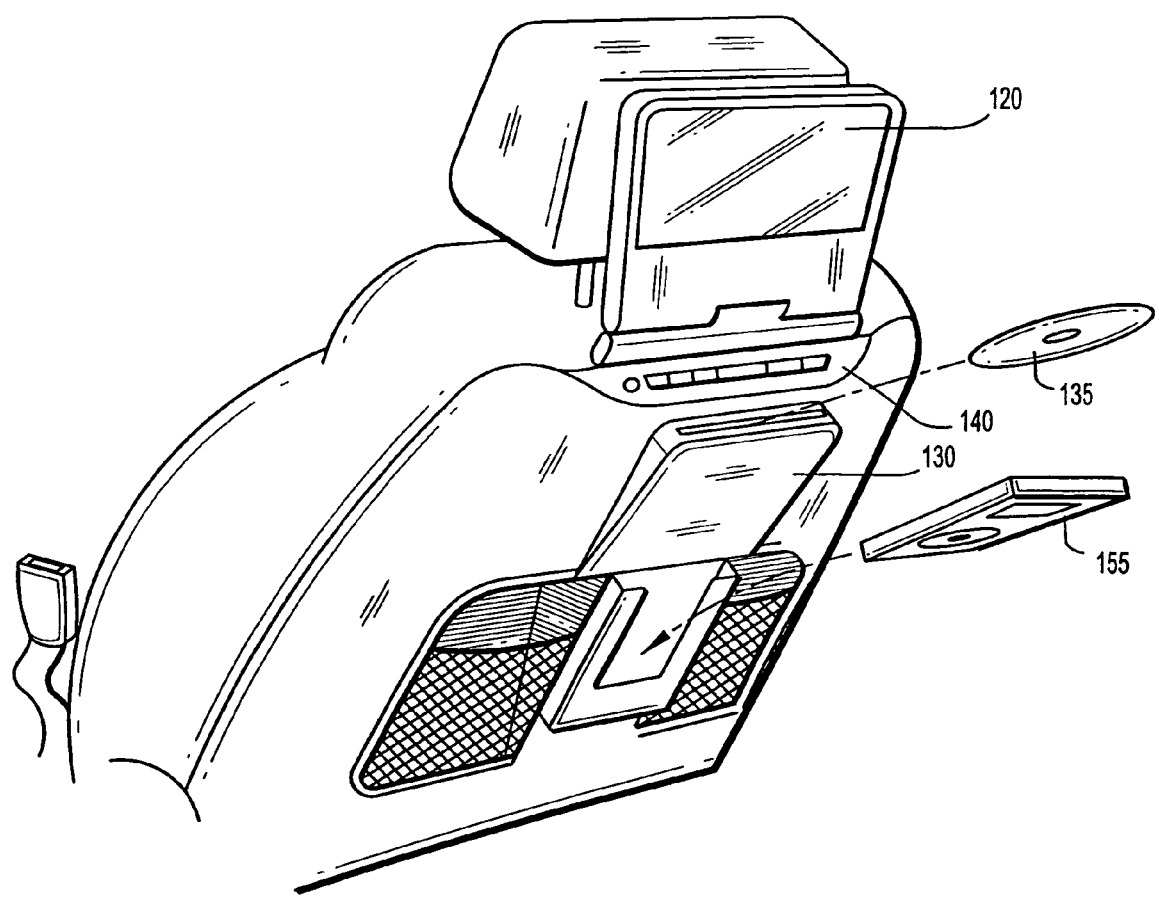
FIG. 5 shows an entertainment system according to an exemplary embodiment of the present invention.

As seen in FIG. 5, the display 120 may push into the seat panel 105 when not in use. The display 120 may also be jointed to allow for rotation about one or more axes when fully extended. When stowing the display 120, the display may be straightened to allow for easy insertion back into the seat panel 105.

In comparing FIG. 4 with FIG. 5, it may be seen that the PMP 155 may be stored within a compartment either covered by the netting 210 as seen in FIG. 4 or not covered by the netting 210 as seen in FIG. 5. When the PMP 155 is not covered by the netting 210, a retaining structure may be used to hold the PMP 155 in place. This solution may provide easy access to the PMP 155 controls.

Figure 6:
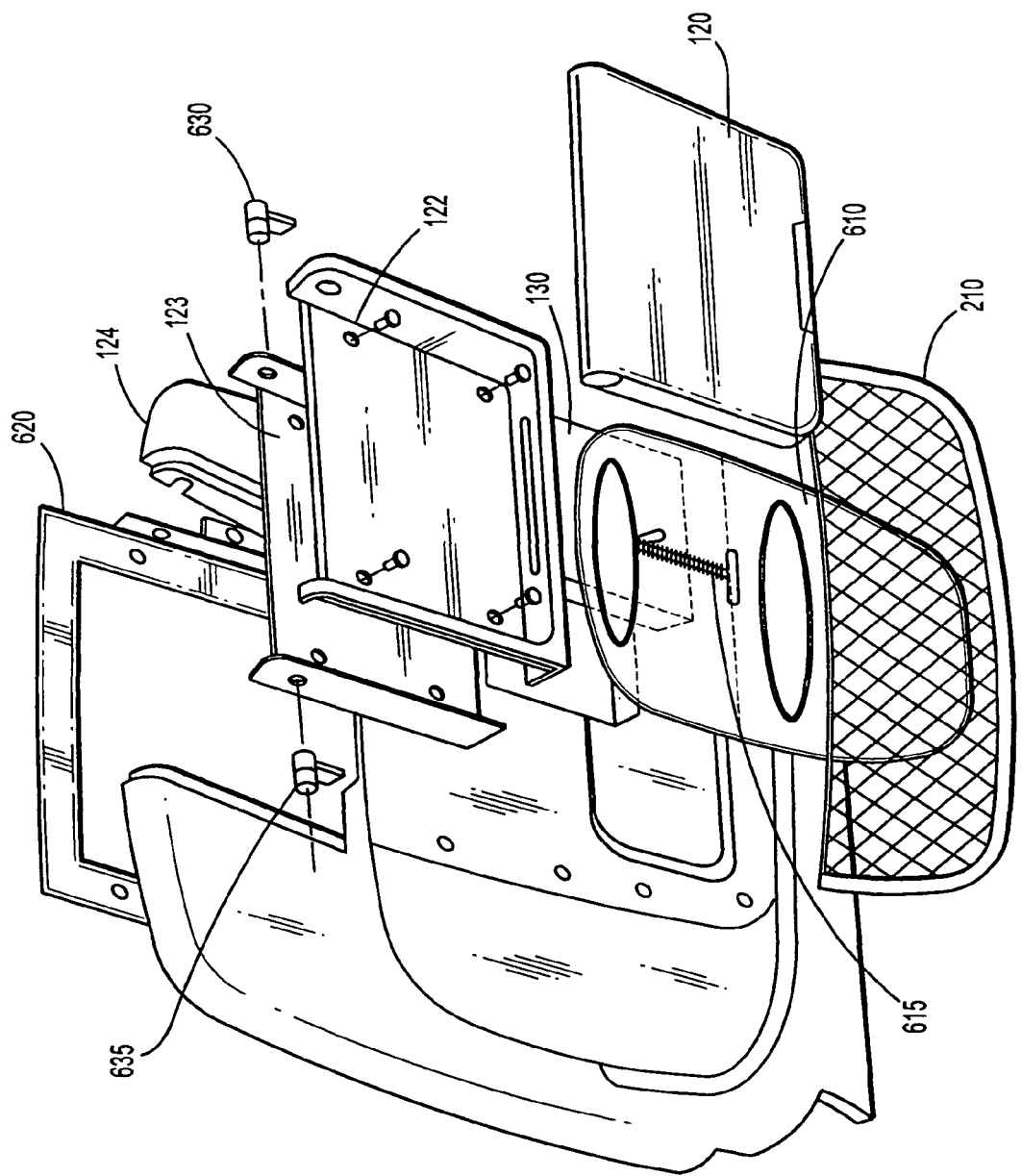
FIG. 6 is an exploded view of an entertainment system according to an exemplary embodiment of the present invention.

FIG. 6 is an exploded view of an entertainment system 100 according to an exemplary embodiment of the present invention. The seat panel 105 may include a seat bracket 620. The seat bracket 620 may be the first portion of the seat panel 105 to be attached to a frame of the seat 107. The seat bracket 620 may have threaded mounts for forming a secure connection. The frame of the seat 107 may be exposed by removing the original equipment seat back panel from the vehicle seat 107. A back panel 124, including attached items as shown in FIG. 6 and described below, may be attached to the seat bracket 620. The back panel 124 may be a thermoform panel. A display bracket 123 may be attached to the back panel 124 by one or more friction hinges 630 and 635. A display frame 122, including a slot for an optical disc, may be attached to the display bracket 123 using one or more fixing devices, such as screws or bolts. Alternatively, the display frame 122 may be held in place within the display bracket 123 by friction. The display subassembly 120 may then be attached to the display frame 122, for example, by one or more hinges 630 and 635. The media player 130 may be mounted below the display frame. Soft pockets 610 and one or more mesh frames 210 may be mounted over the back panel 124. A zipper 615 may be used to provide access to the media player 130 for removal or service maintenance of the media player 130.

Figure 7:
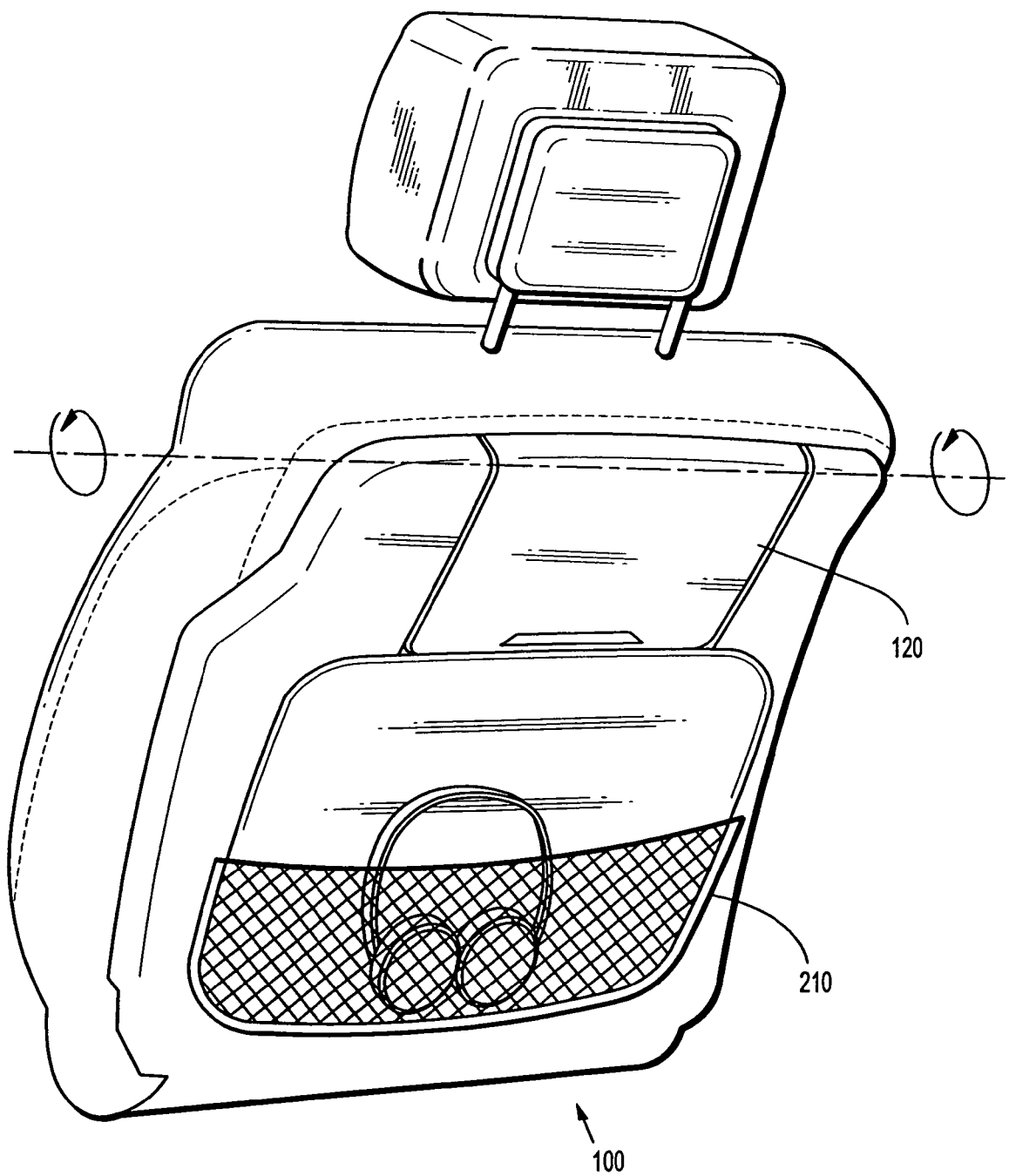
FIG. 7 is an exploded view of an entertainment system according to an exemplary embodiment of the present invention.

As can be seen in FIG. 7, the display 120 may be rotated by any angle, for example by 210°. Various pockets, for example, a pocket for holding the PMP may include a zipper, Velcro or another fastening device. For example, the zipper 615 shown in FIG. 6, may provide access to a pocket for holding the PMP. The netting 210 may be used to hold accessories and peripherals such as headphones. The pocket may be removable and may be snap-on.

Figure 8:
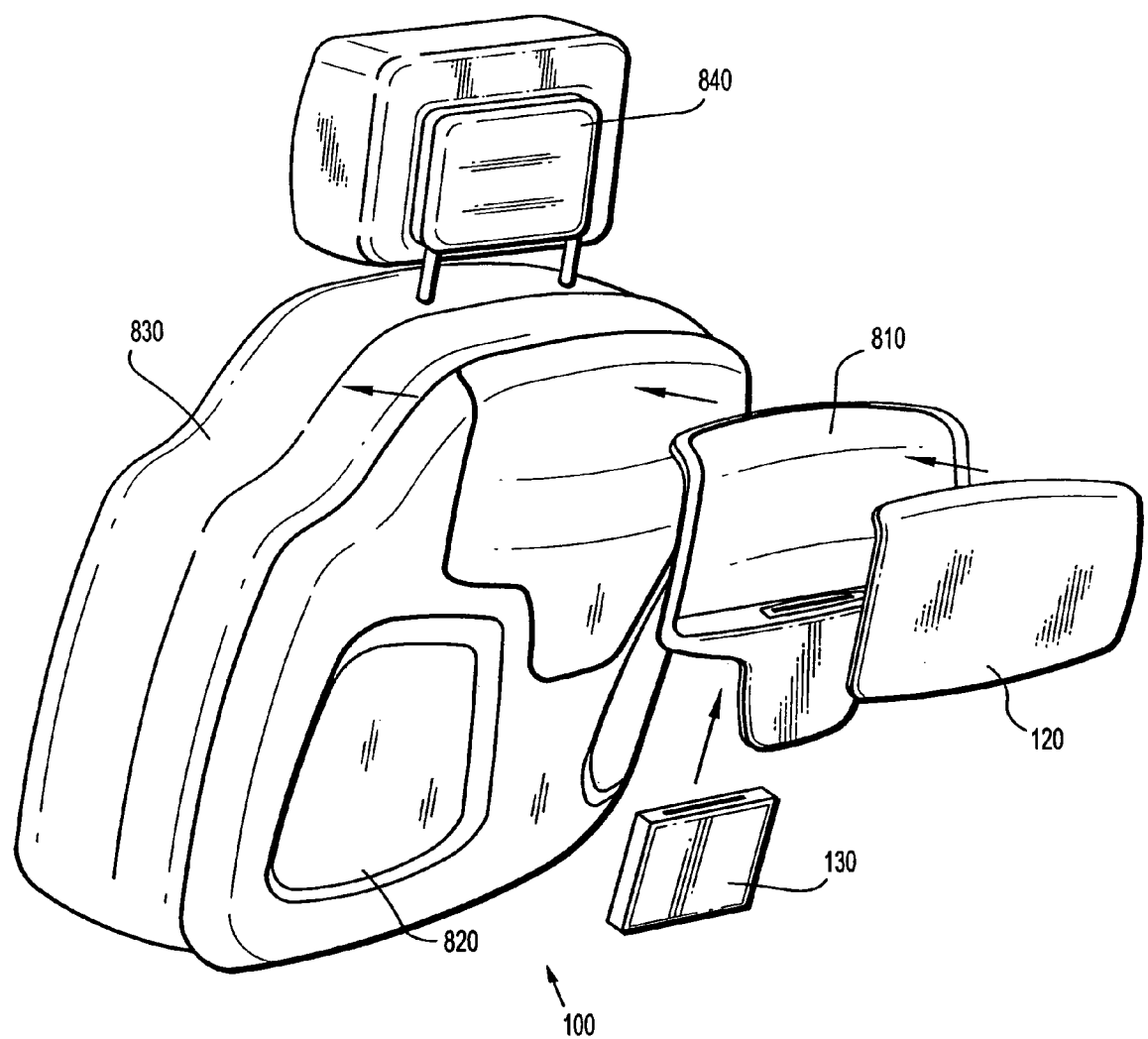
FIG. 8 is an exploded view of an entertainment system according to an exemplary embodiment of the present invention.

FIG. 8 is an exploded view of an entertainment system according to an exemplary embodiment of the present invention. The display panel 120 may attach to a faceplate unit 810. The faceplate unit may include a slot for loading a media disc. The media player 130 may be attached to the faceplate unit such that a disc inserted into the slot of the faceplate is passed through to the media player. The faceplate may attach to a back plate 820. The entertainment system may thus be formed onto the back plate. The back plate may be customized to interface with a particular model vehicle. Other components of the entertainment system need not be vehicle model specific. Alternatively, to the extent varying seat designs will permit, a universal back plate 820 sized to fit multiple vehicles is also contemplated so as to allow for stocking of one or two SKUs instead of a SKU for each vehicle.

The entertainment system may be installed to a vehicle seat 830 including a seat headrest 840. Installation may include removal of an original equipment seat panel. The original equipment seat panel may be replaced with the back plate 820 of the entertainment system. Entertainment systems according to exemplary embodiments of the present invention may be sold as kits including a back plate 820 for a particular vehicle model and a set of remaining parts that are non-specific. The kit may also include a PMP interface dock that is specific to a particular model of PMP.

Figure 9:
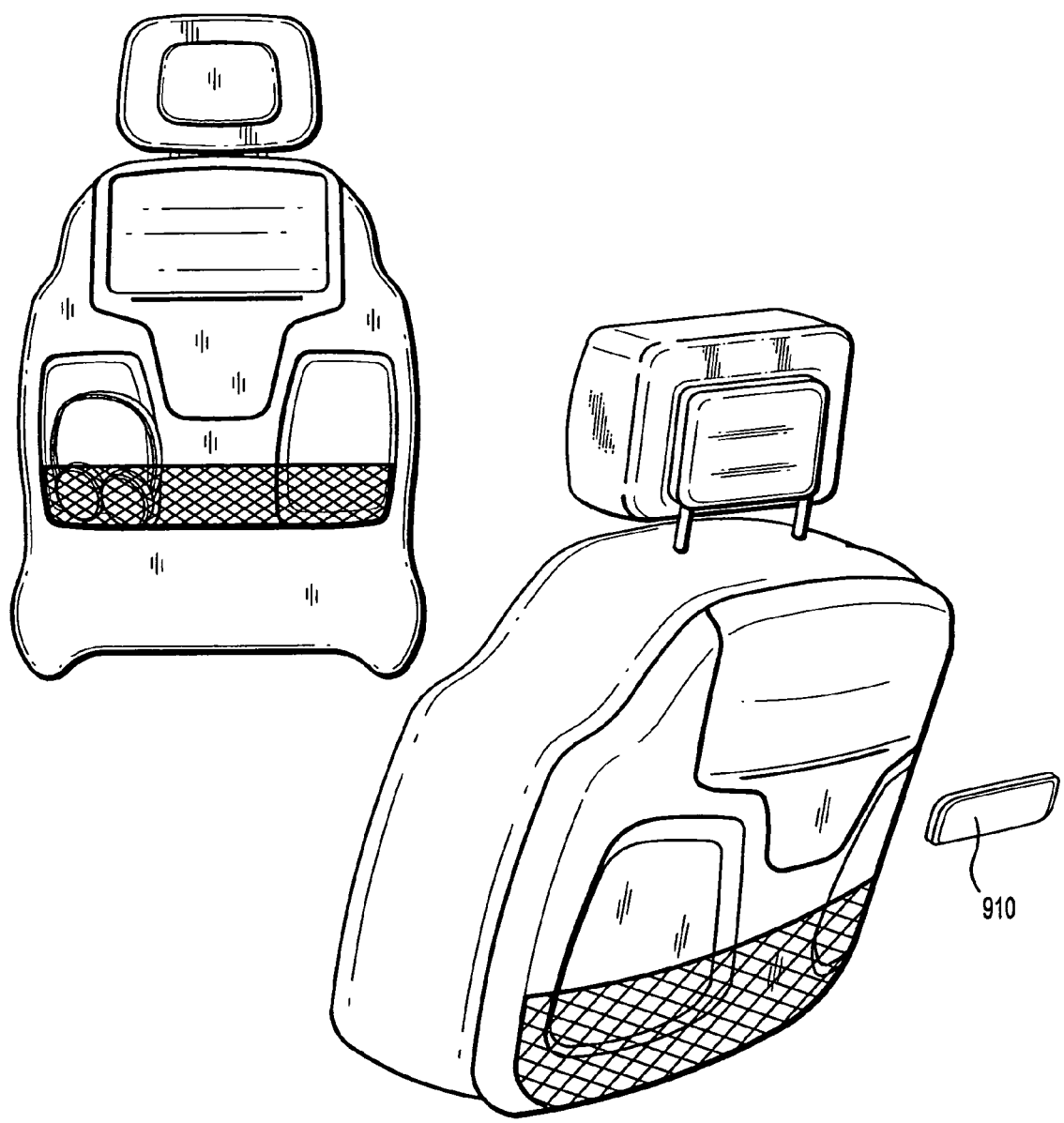
FIG. 9 shows an entertainment system according to an exemplary embodiment of the present invention.
Figure 10:
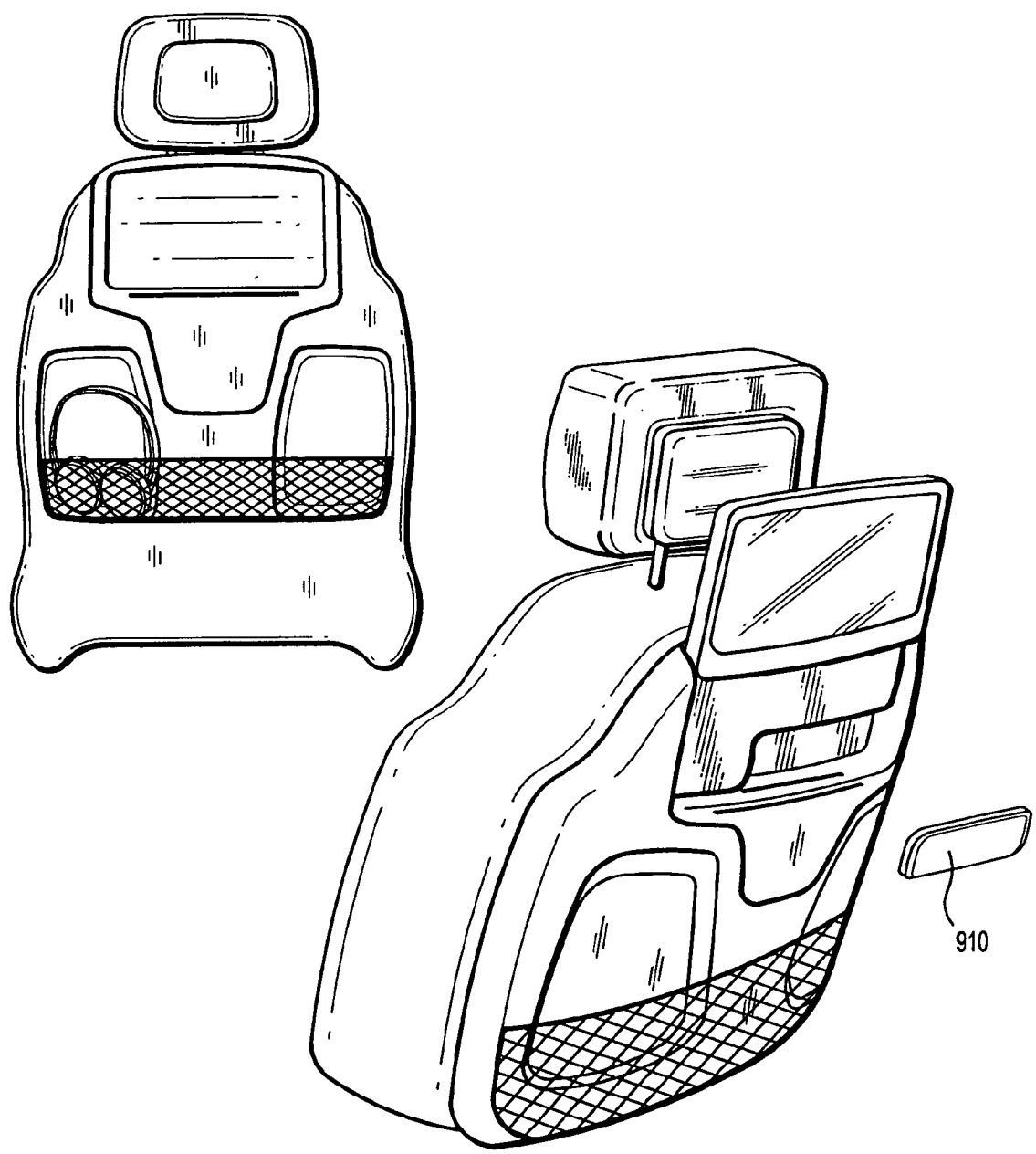
FIG. 10 shows an entertainment system according to an exemplary embodiment of the present invention.
Figure 11:
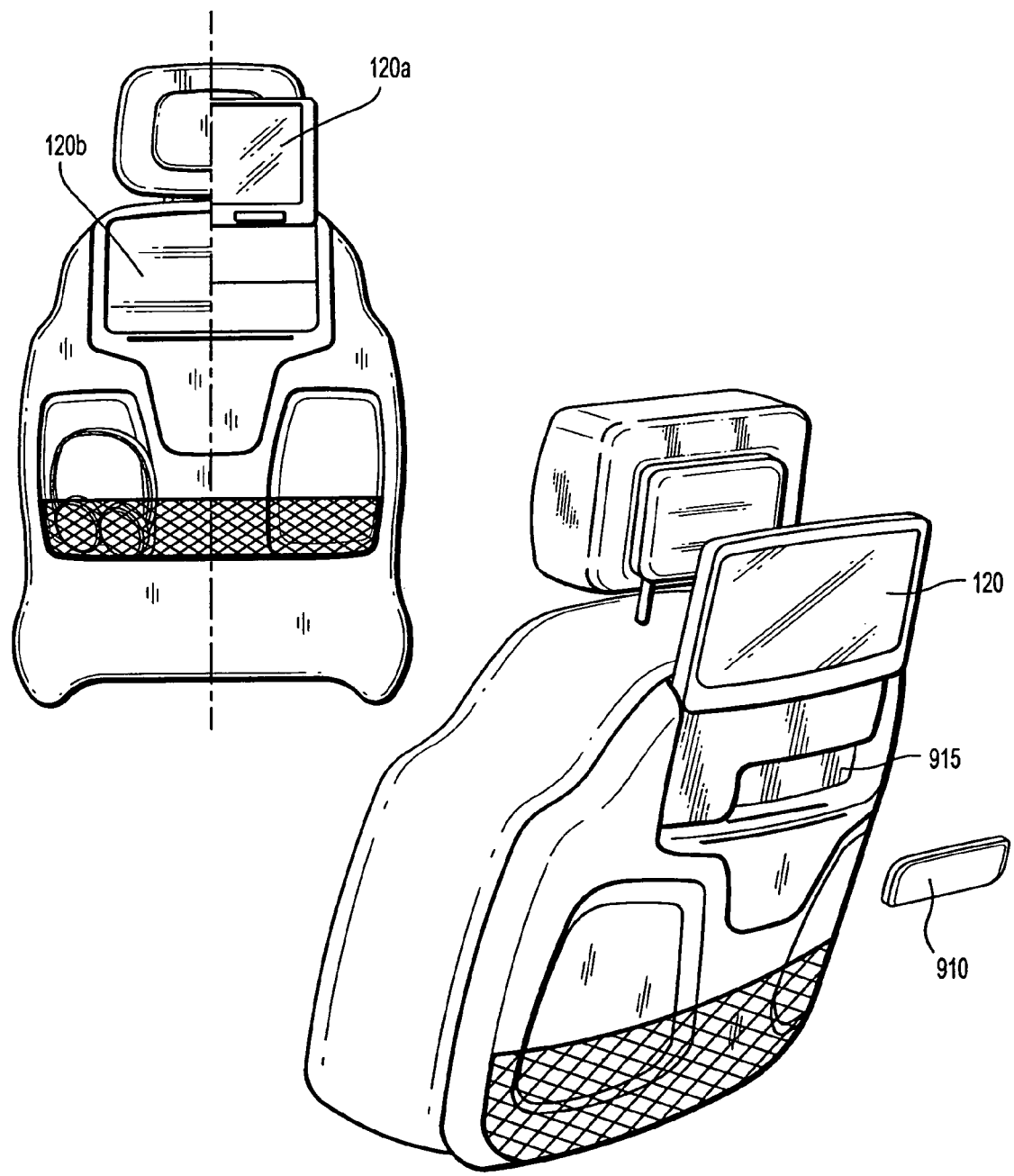
FIG. 11 shows an entertainment system according to an exemplary embodiment of the present invention.

As can be seen from FIG. 9, exemplary embodiments of the present invention may utilize a separate remote control 910 for controlling the function of the media player, a docked PMP or any other entertainment system feature. For example, the remote control may also include game controllers and be used as a video game controller. The remote control may be secured to the vehicle seat panel 105 when not in use. As seen in FIGS. 10 and 11, the remote control 910 may be secured in a remote control cutout 915 located behind the display 120 and may thus be concealed when the display 120 is in a closed position. FIG. 11 illustrates the ability of the display 120 to flip between a closed position 120b and an open position 120a for exemplary embodiments where the display 120 flips up and down rather than sliding in and out.

Figure 12:
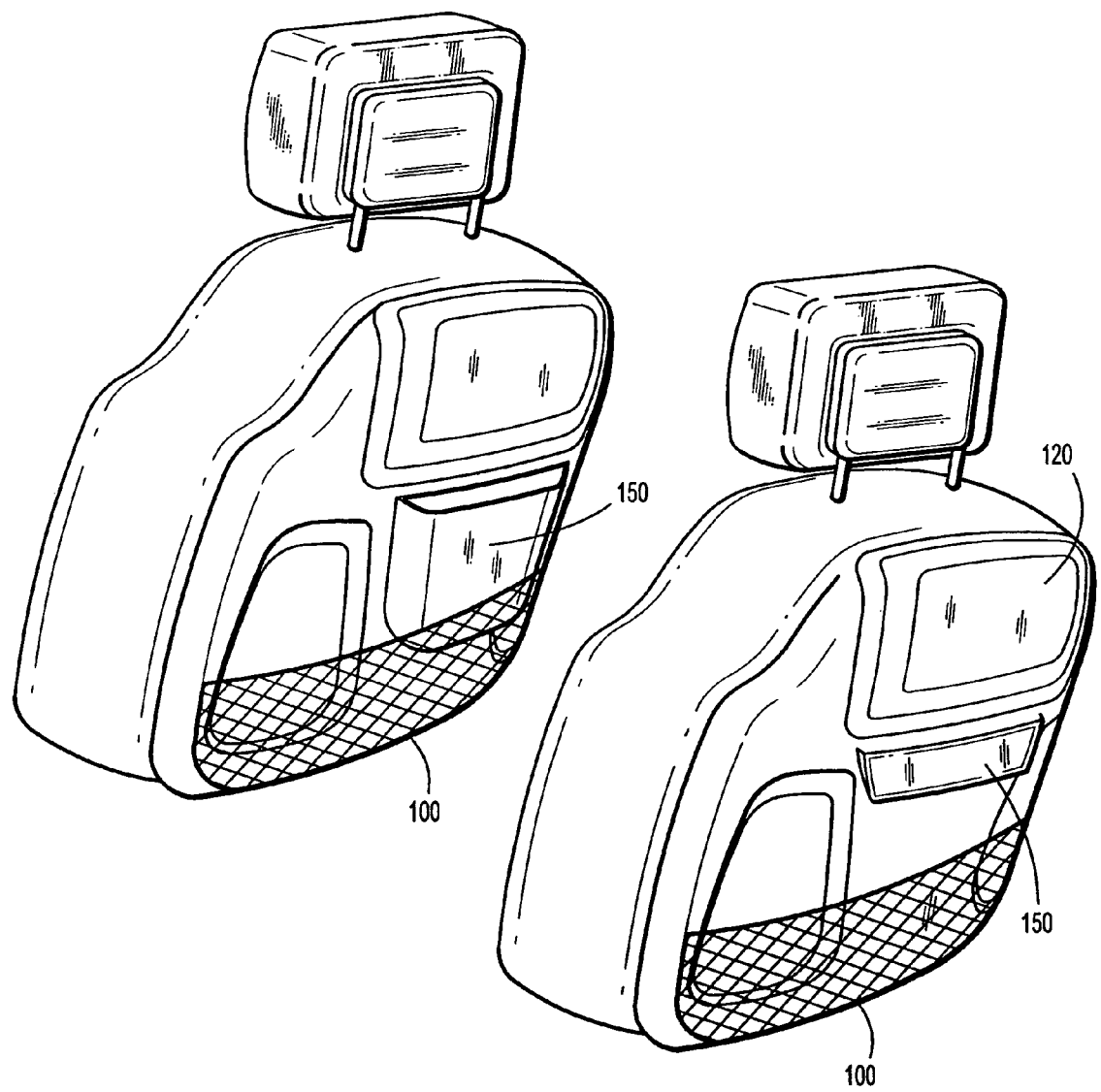
FIG. 12 shows an entertainment system according to an exemplary embodiment of the present invention.

FIG. 12 is another view of an entertainment system 100 according to an exemplary embodiment of the present invention. As seen in FIG. 12, the PMP dock 150 may include a pocket and/or area for containing the PMP in a secure and discrete fashion. The PMP dock may be an attached pocket or may be provided by creating a raised region on the surface of the vehicle seat panel 105 (as shown).

Figure 13:
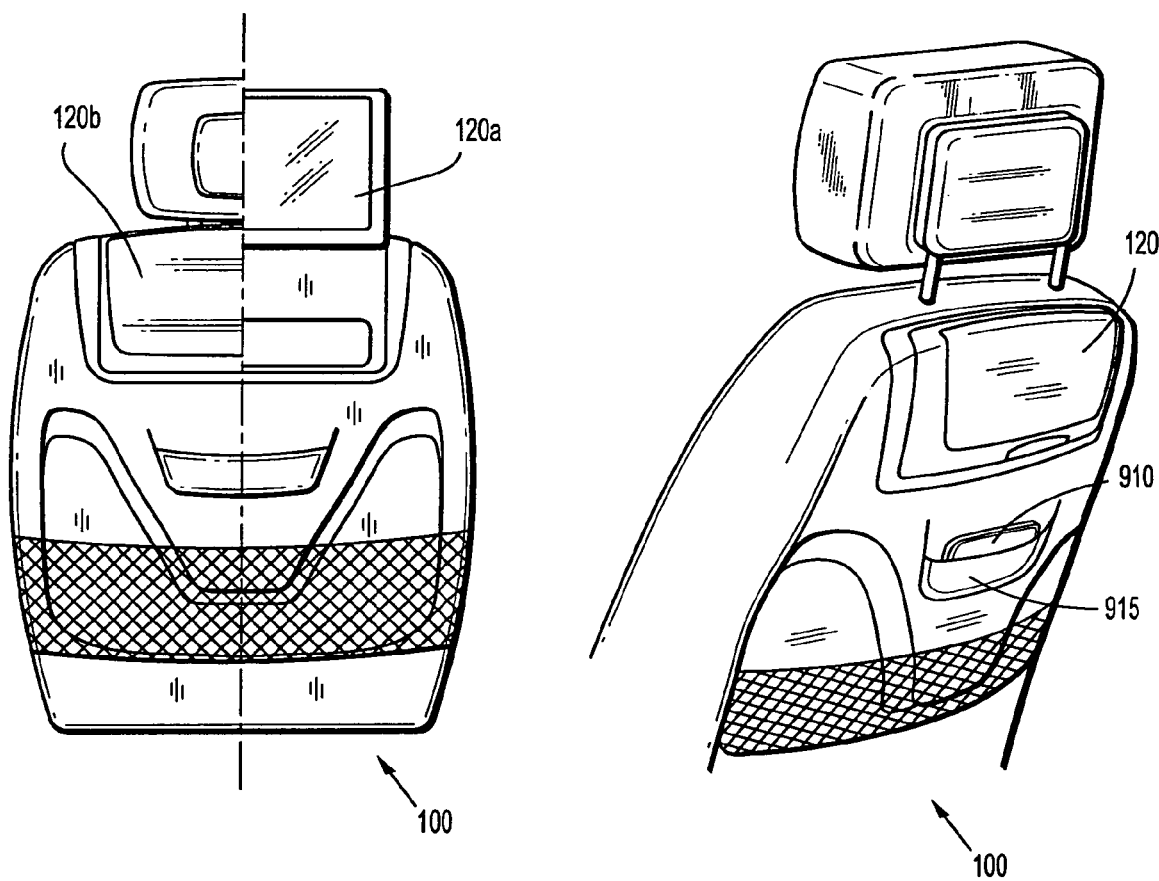
FIG. 13 shows an entertainment system according to an exemplary embodiment of the present invention.

FIG. 13 shows an entertainment system 100 according to an exemplary embodiment of the present invention. As can be seen in FIG. 13, the remote control 910 may be stowed in a remote control pocket 915. Such a pocket may also be used to stow a PMP or other accessories and peripherals.

Figure 14:
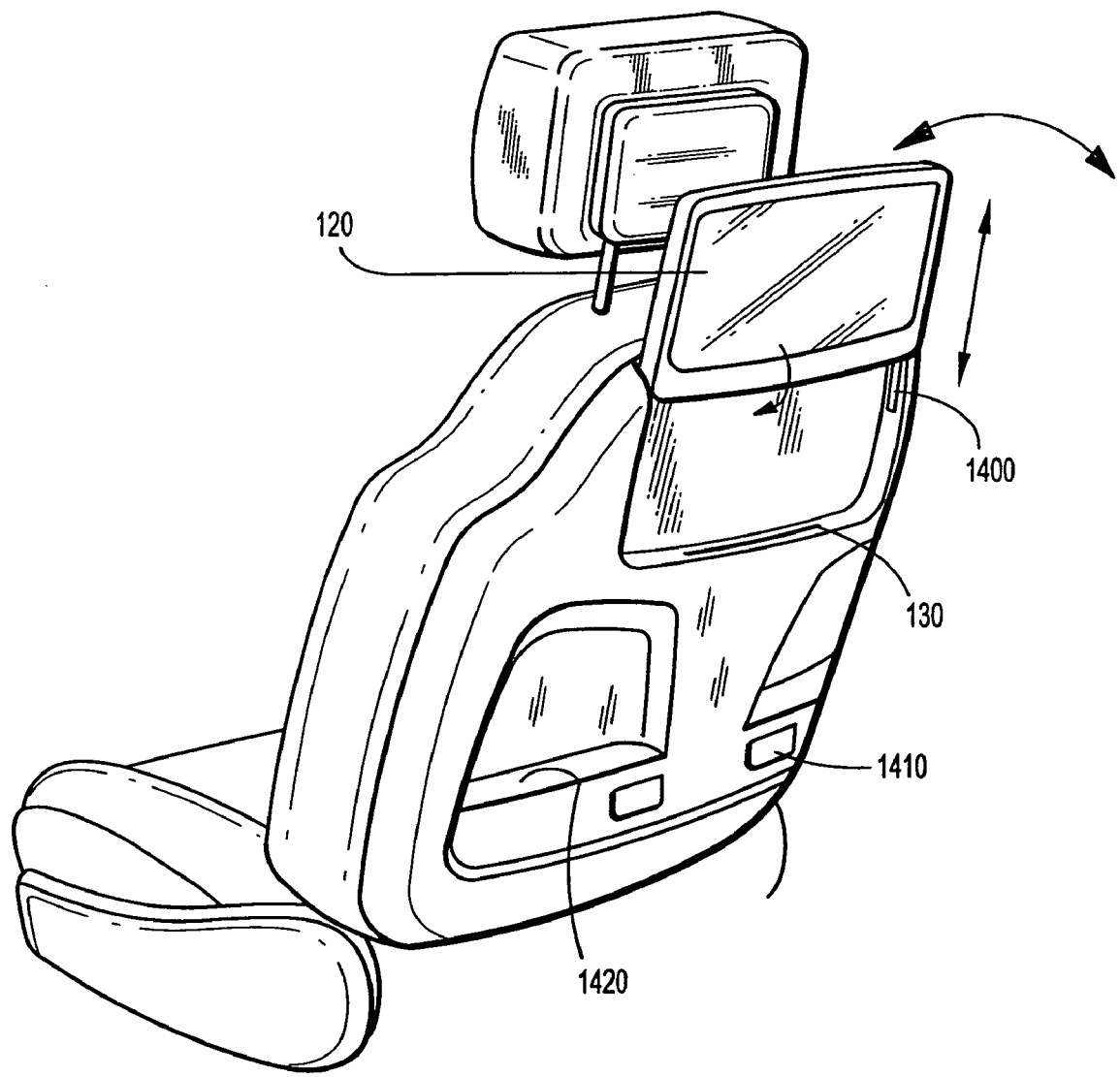
FIG. 14 shows an entertainment system according to an exemplary embodiment of the present invention.

As can be seen in FIG. 14, the display 120 may slide on tracks 1400 to adjust the height of the display and to reveal access to the media player 130. Accordingly, the display 120 may be able to be viewed at a more comfortable location after having been flipped open. The display 120 may have the ability to flip out then slide. This may be used to permit the screen to face the rear-seat passenger when in use and then face inwards when not in use so that the front of the display may be protected. One or more secondary pockets 1410 may be located on the primary pockets 1420.

Figure 15:
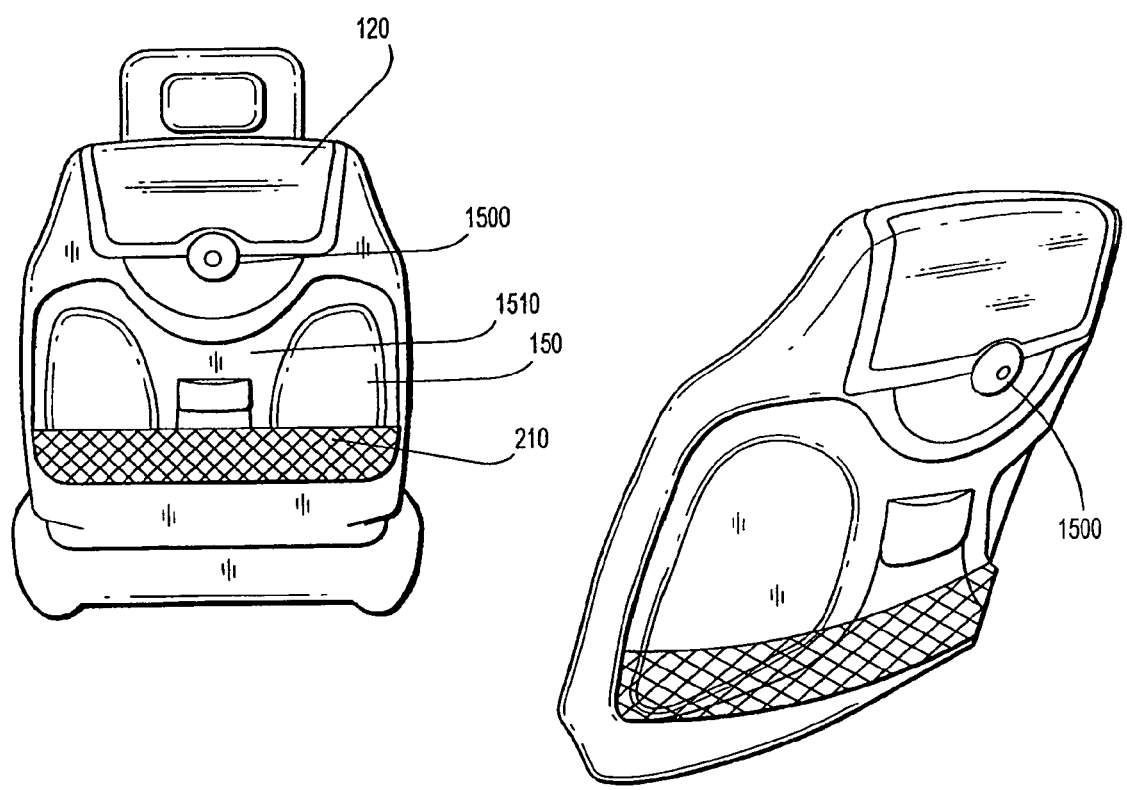
FIG. 15 shows an entertainment system according to an exemplary embodiment of the present invention.
Figure 16:
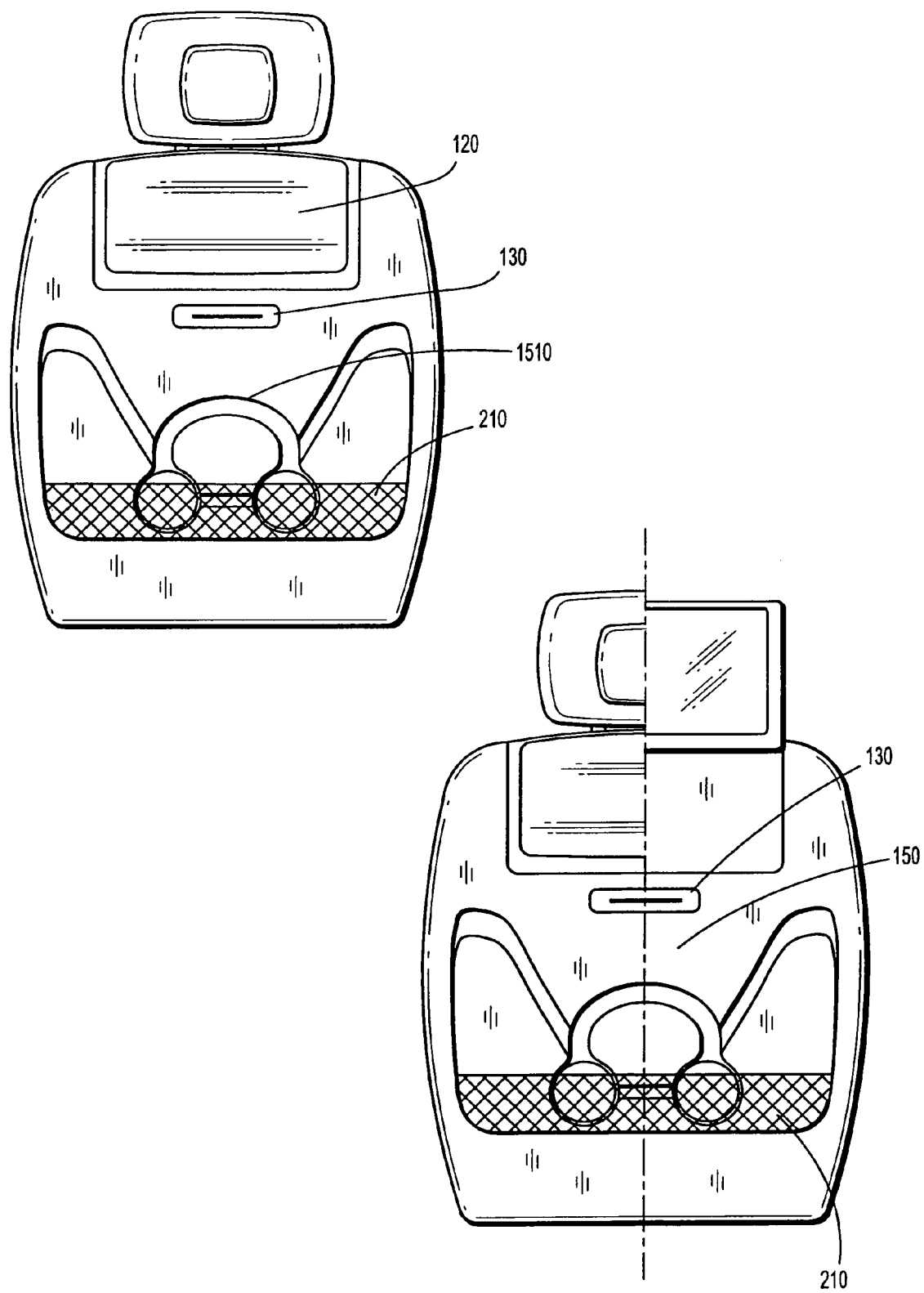
FIG. 16 shows an entertainment system according to an exemplary embodiment of the present invention.

As can be seen in FIGS. 15 and 16, a release latch 1500 may be used to secure the display 120 when in the closed position. A headphone recess 1510 may also be included to accept and hold a pair of headphones.

Figure 17:
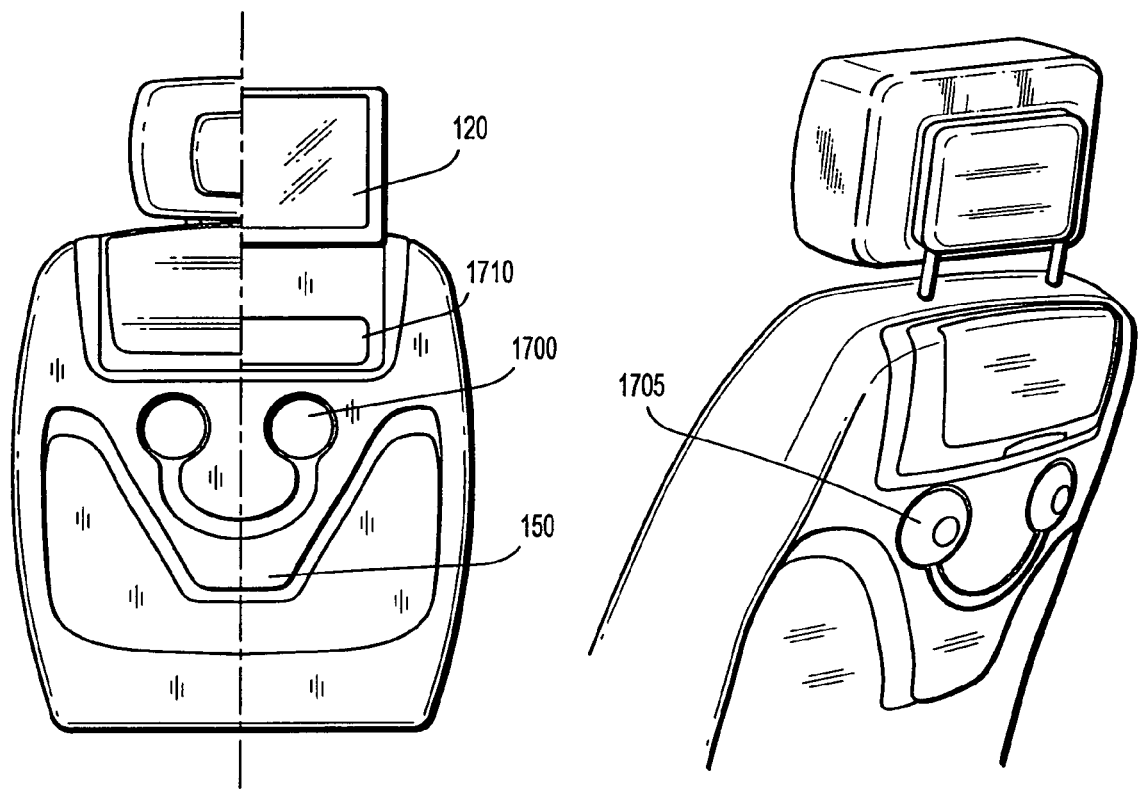
FIG. 17 shows an entertainment system according to an exemplary embodiment of the present invention.

As can be seen in FIG. 17, a remote control recess 1710 may be used to stow a remote control and a headphone molding 1700 may be used to stow a pair of headphones 1705.

Figure 18:
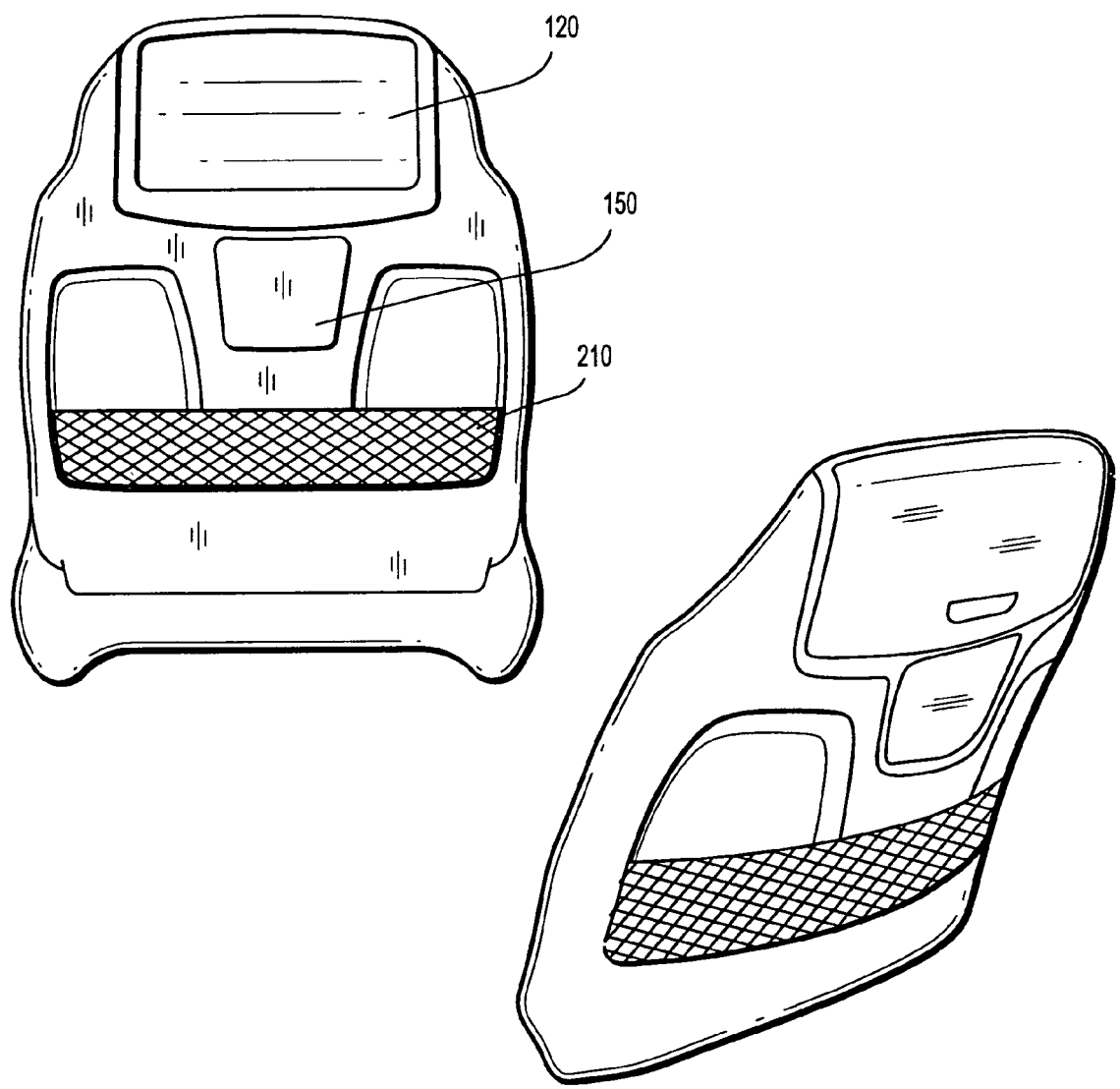
FIG. 18 shows an entertainment system according to an exemplary embodiment of the present invention.
Figure 19:
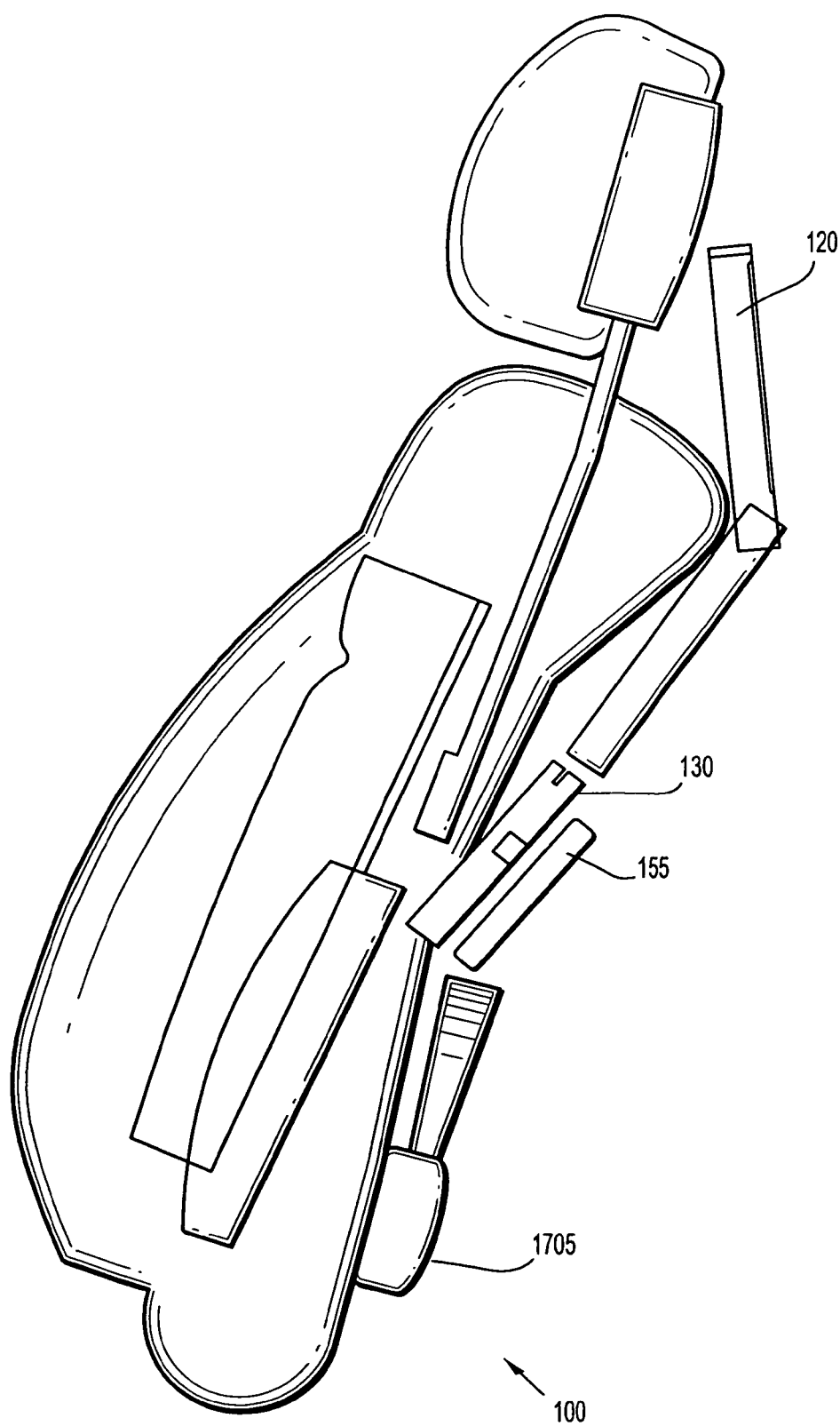
FIG. 19 shows a profile view of an entertainment system according to an exemplary embodiment of the present invention.
Figure 20:
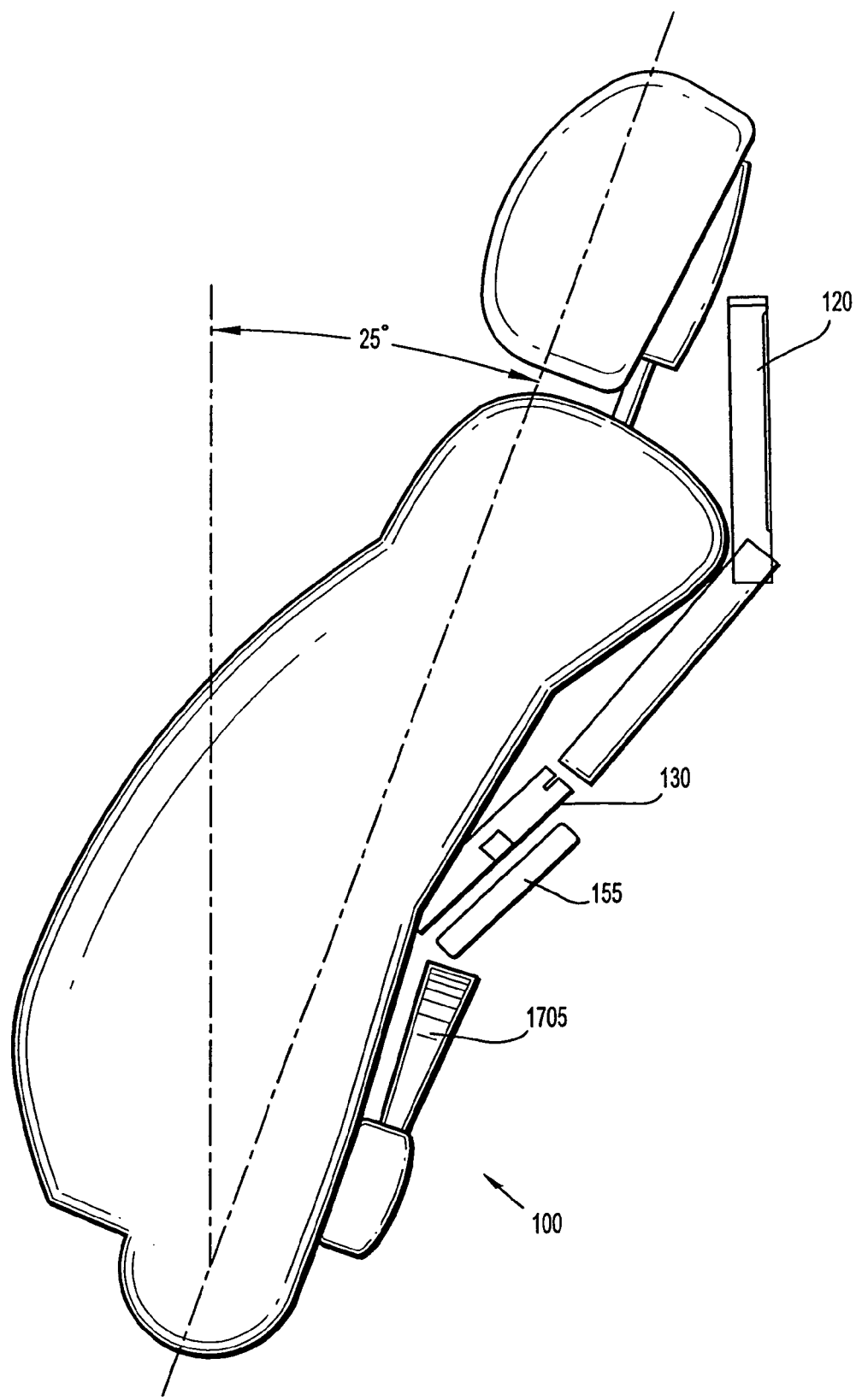
FIG. 20 shows a profile view of an entertainment system according to an exemplary embodiment of the present invention.
Figure 21:
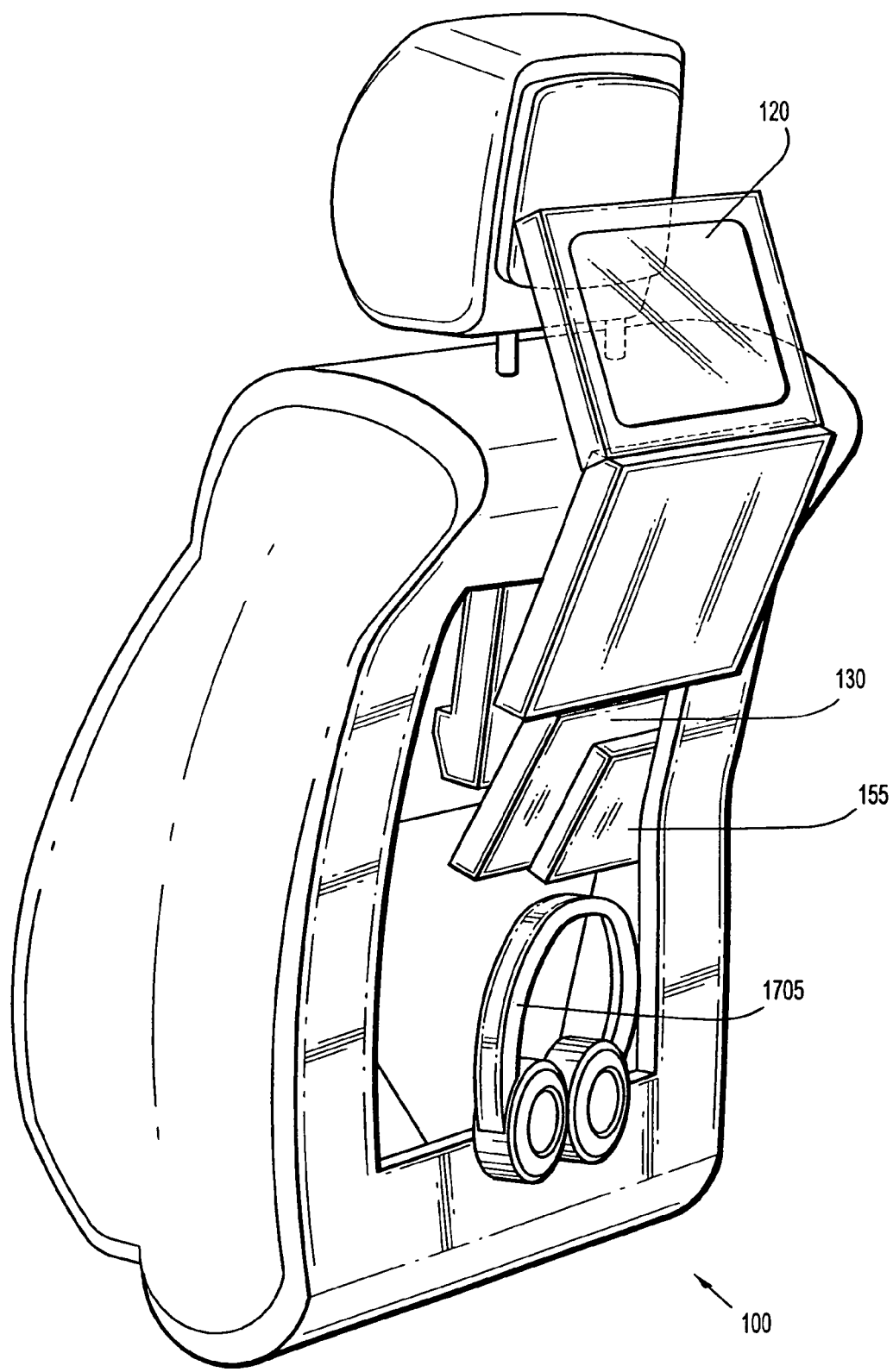
FIG. 21 shows a perspective view of an entertainment system according to an exemplary embodiment of the present invention.

FIG. 18 is another view of an entertainment system according to an exemplary embodiment of the present invention.

FIGS. 19-22 show a profile view of an entertainment system according to an exemplary embodiment of the present invention. The pair of headphones 1705, PMP 155, media player 130, and display 120 may all be aligned as shown. The vehicle seat may be adjusted back, for example, by as much as 25°. To ensure a comfortable viewing angle under such conditions, the display 120 may be able to angle back more than 180° from the closed position. The display 120 may be held in the desired position by friction and/or by locking into preset positions. For example, there may be preset positions using, for example, detents at 5° intervals within a range of angles for which viewing may be desired. Further, an auto-lift feature may be incorporated with the display so that when the display is released from a locked position, the display automatically rotates outward to a predetermined angle. The auto-lift feature may, for example, automatically rotate the screen to a fixed position between a horizontal position and 180° of rotation. The fixed position may be selected such that the screen does not stay in a position that may potentially exacerbate user injury in the event of a car accident.

According to one exemplary embodiment of the present invention, the display may auto-lift from a closed position to a ready position over a range of angles "a." Then, the display may be positioned and held in place by friction over a range of angles "b." The display panel may be positioned and held in place by friction over a range of angles "c" that are below a centerline or over a range of angles "d" that are above a centerline. Similarly, the display panel may be positioned and held in place by friction over a range of angles "e." As optimal viewing may occur within a range of angles "f," a combination of friction and detents may be used to secure the display in this position so that sudden movements of the vehicle do not knock the display out of the desired angle.

Figures 22, 23:
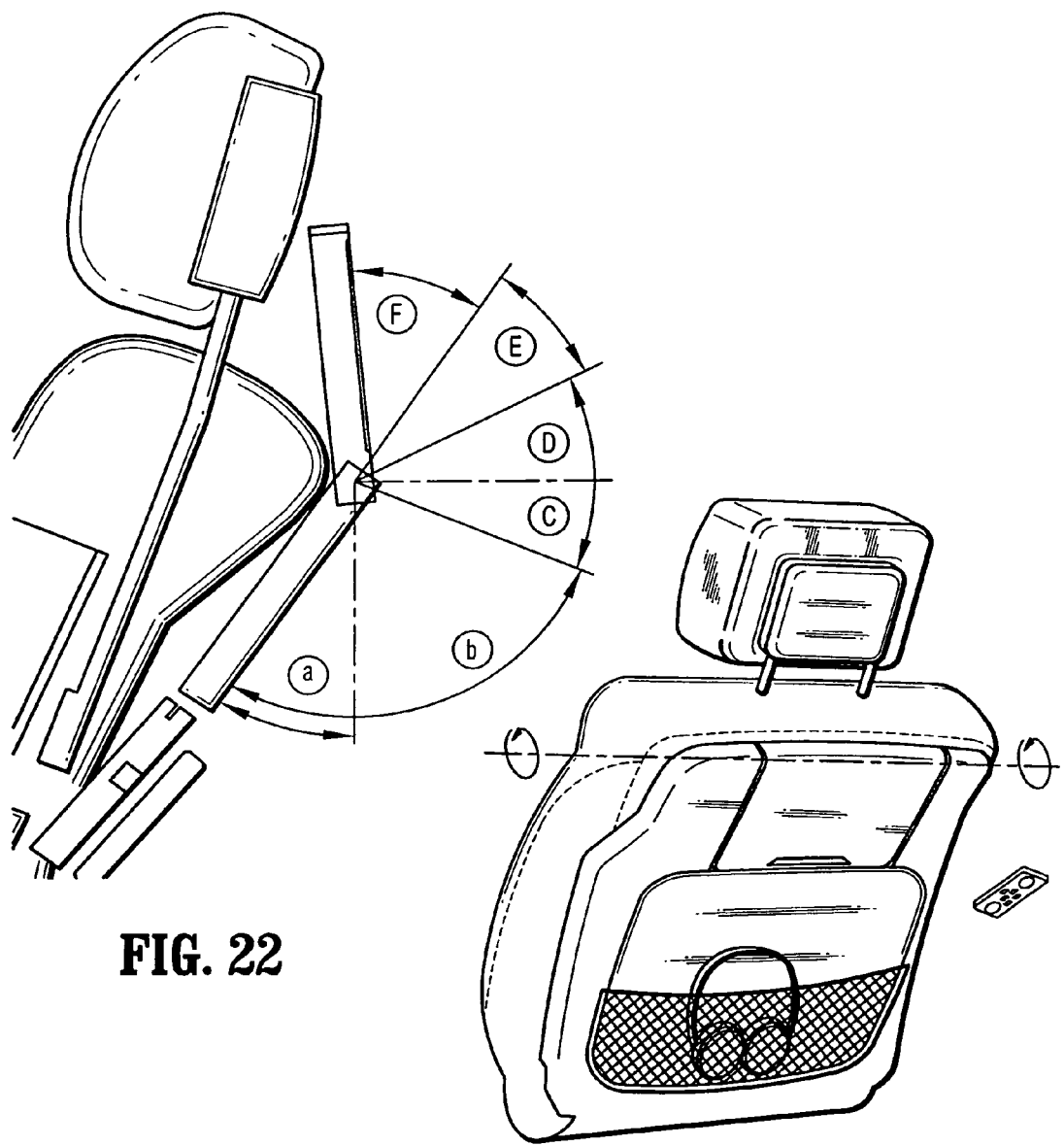
FIG. 22 shows a profile view of an entertainment system according to an exemplary embodiment of the present invention.
FIG. 23 shows a perspective view of an entertainment system according to an exemplary embodiment of the present invention.

As seen in FIG. 23, jacks may be provided for connecting headphones and auxiliary audio and/or video inputs. An IR sensor may be provided for receiving remote control signals. One or more neoprene pouches may additionally be provided.

Figure 24:
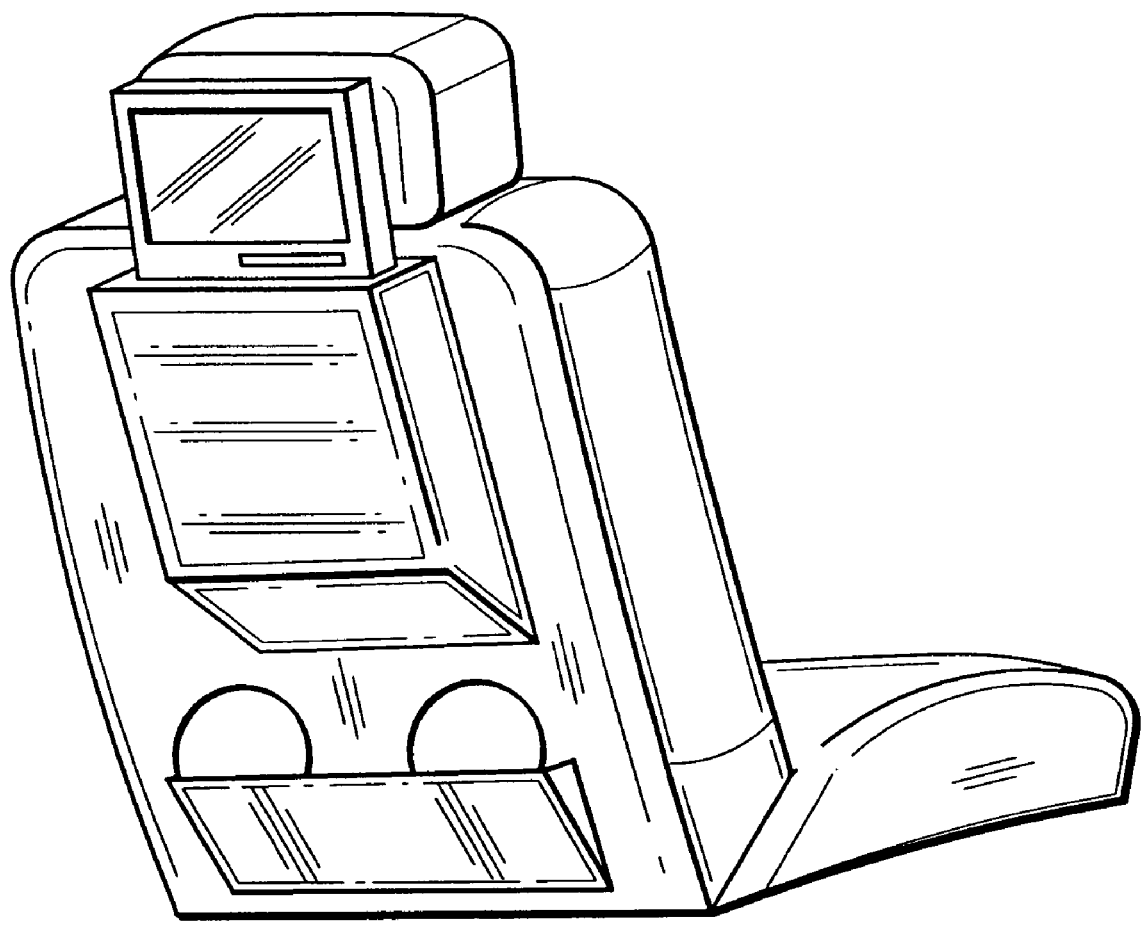
FIG. 24 shows an entertainment system according to an exemplary embodiment of the present invention.
Figure 25:
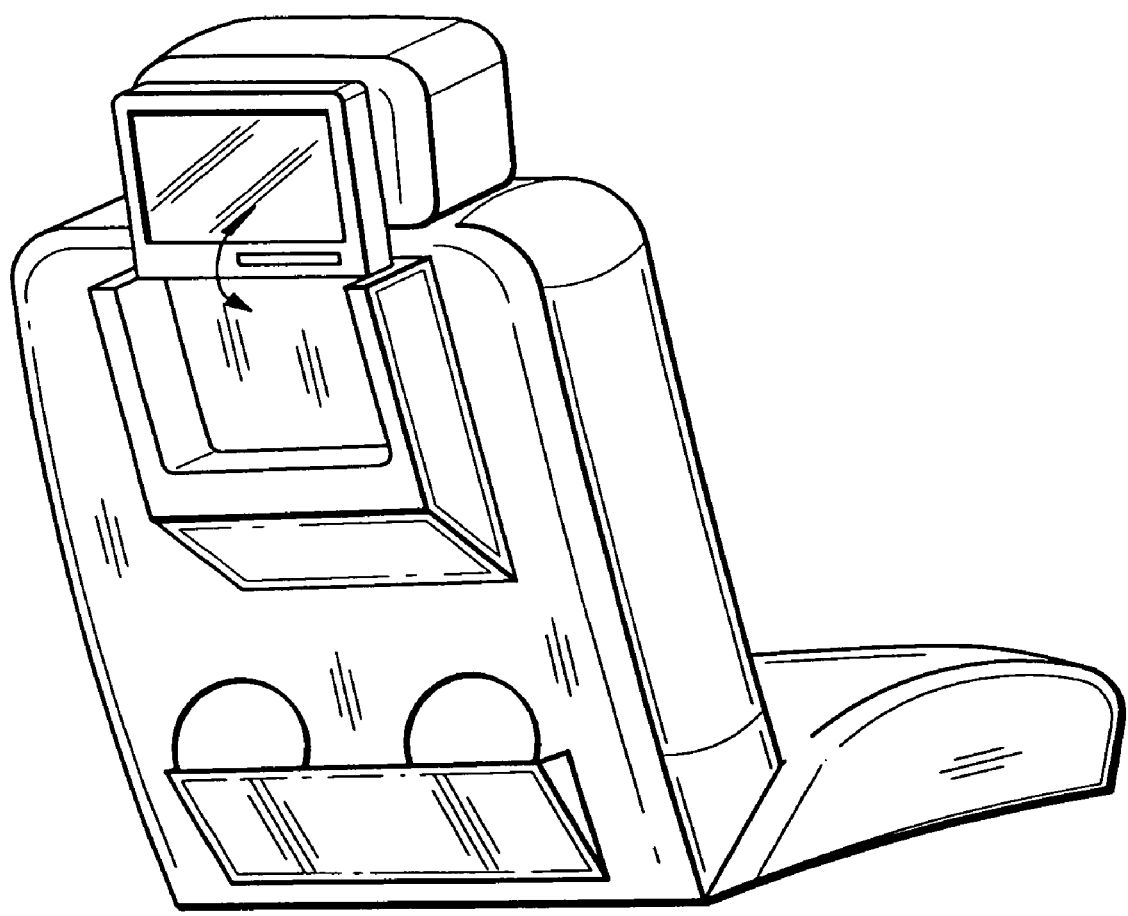
FIG. 25 shows an entertainment system according to an exemplary embodiment of the present invention.
Figure 26:
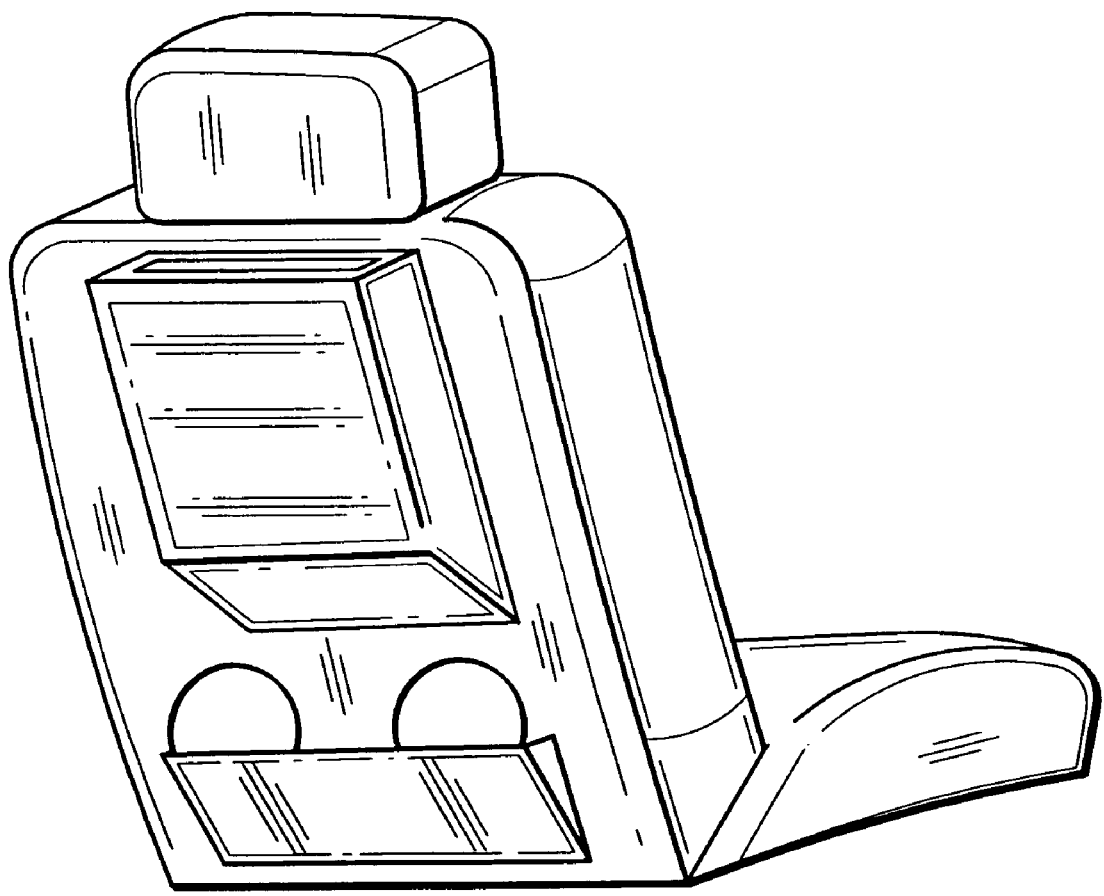
FIG. 26 shows an entertainment system according to an exemplary embodiment of the present invention.
Figure 27:
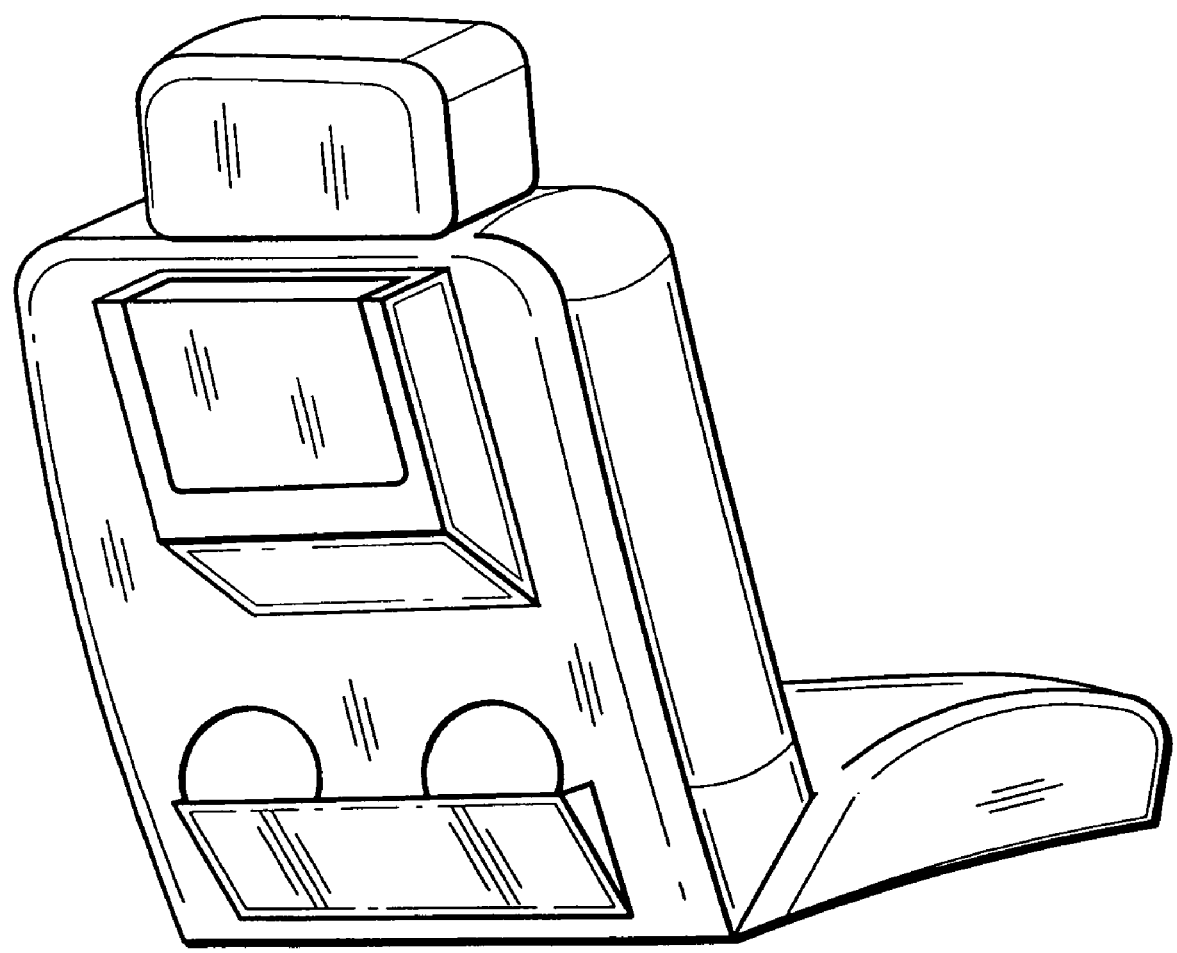
FIG. 27 shows an entertainment system according to an exemplary embodiment of the present invention.
Figure 28:
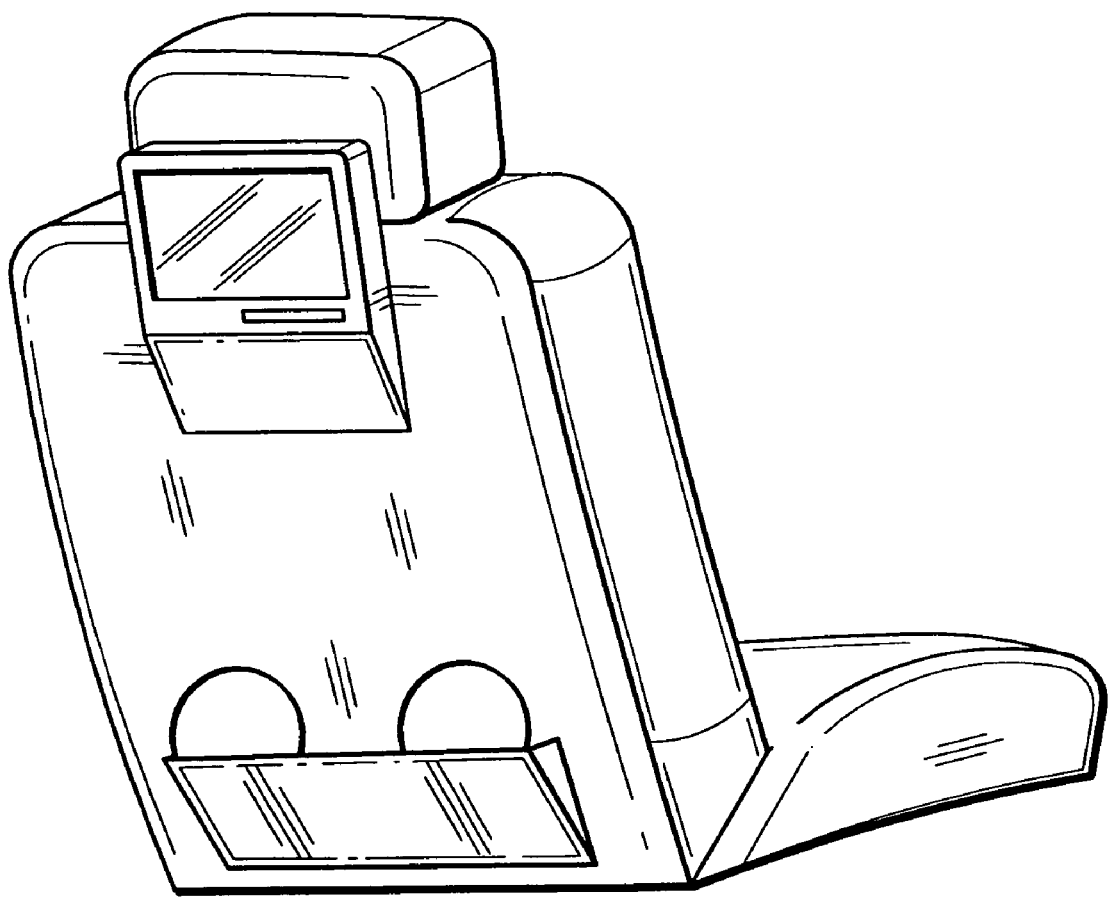
FIG. 28 shows an entertainment system according to an exemplary embodiment of the present invention.

FIGS. 24-28 show other possible exemplary embodiments of the present invention. In FIG. 24, the display retracts in a downwards motion into the back of the seat. Whereas in FIG. 25, the display flips open and swivels up into a viewing position and closes to conceal the display when not in use. In FIG. 26, the display is illustrated as having been retracted into the panel. Here, the display may be spring-loaded and may be opened and closed by a push-action on the top of the display. In FIG. 27, a flip-open display is shown in the closed position. In FIG. 28, the display is shown as being in a fixed position.

As discussed above, the entertainment system may be mounted onto a vehicle seat. In addition to physical installation, various electrical connections may be made. For example, the entertainment system may be powered by connecting the system to the vehicle's power supply. Alternatively, the system may include its own power supply such as replaceable and/or rechargeable batteries.

The entertainment system may also be connected to one or more antenna, for example antenna external to the vehicle. Such antenna may be used for reception of terrestrial radio and/or television or satellite radio and/or television broadcast. An antenna may also be used for wireless network communication.

Connectors may also be used to interface the vehicle audio system so that sound from the entertainment system may be played through the vehicle's audio system. Alternatively, the entertainment system may include an FM transmitter so the audio may be tuned in through the vehicles FM radio.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A seat back entertainment system, comprising:
a seat panel connected directly to a structural frame of a vehicle seat;
a video unit for providing a video signal;
a display device mounted to the seat panel, the display device displaying the video signal provided by the video unit; and
one or more compartments formed in the seat panel,
wherein the video unit includes a slot-loading optical disc drive that is oriented nearly vertically with respect to the seat panel,
wherein the display device is rotatable connected to the seat panel such that the display device flips out from a cavity in the seat panel into a viewing position and flips back into the cavity of the seat panel when not in the viewing position, and
wherein the slot-loading optical disc drive is located within the seat panel and below the cavity of the display device such that a loading slot of the slot-loading optical disc drive faces into the cavity of the display device so that the cavity of the display device forms a space for receiving an optical disc that has been ejected from the loading slot of the slot-loading optical disc drive when the display device is in the viewing position.

2. The seat back entertainment system of claim 1, wherein the video unit includes connectors for receiving video input from an external media player.

3. The seat back entertainment system of claim 1, wherein the video unit comprises a personal media player (PMP) dock for receiving a PMP and communicating a video signal from the PMP to the display device.

4. The seat back entertainment system of claim 1, wherein the video unit includes a media player.

5. The seat back entertainment system of claim 4, wherein the media player is an optical disc playback device.

6. The seat back entertainment system of claim 4, wherein the media player includes one or more ports for receiving media stored on an external USB device or a memory card.

7. The seat back entertainment system of claim 1 wherein the one or more compartments include one or more pockets or nettings.

8. The seat back entertainment system of claim 1, wherein the display device folds down or slides into the seat panel when not in use.

9. The seat back entertainment system of claim 1, wherein the display device is rotatably mounted to the seat panel.

10. The seat back entertainment system of claim 1,
wherein the seat panel is a replacement seat panel shaped to accommodate a single make and model of vehicle, and
wherein the seat panel is shaped to directly connect to the structural frame of the vehicle seat after an original-equipment seat back panel has been removed from the vehicle seat.

11. A method for installing a seatback entertainment system, comprising:
removing an original seat back panel from a vehicle seat and exposing a structural frame of the vehicle seat;
attaching an entertainment system seat panel directly to the exposed structural frame of the vehicle seat, wherein the entertainment seat panel includes:
a video unit for providing a video signal;
a display device mounted to the entertainment system seat panel, the display device displaying the video signal provided by the video unit; and
one or more compartments formed in the entertainment system panel,
wherein the video unit includes a slot-loading optical disc drive that is oriented nearly vertically with respect to the seat panel,
wherein the display device is rotatable connected to the seat panel such that the display device flips out from a cavity in the seat panel into a viewing position and flips back into the cavity of the seat panel when not in the viewing position, and
wherein the slot-loading optical disc drive is located within the seat panel and below the cavity of the display device such that a loading slot of the slot-loading optical disc drive faces into the cavity of the display device so that the cavity of the display device forms a space for receiving an optical disc that has been ejected from the loading slot of the slot-loading optical disc drive when the display device is in the viewing position.

12. The method of claim 11, wherein the entertainment system seat panel is selected from a plurality of available entertainment system seat panels according to a make and model of the vehicle, wherein each of the available entertainment system seat panels is shaped to accommodate a single make and model of vehicle.

13. The method of claim 11, wherein the video unit includes connectors for receiving video input from an external media player.

14. The method of claim 11, wherein the video unit comprises a personal media player (PMP) dock for receiving a PMP and communicating a video signal from the PMP to the display device.

15. The method of claim 11, wherein the display device folds down or slides into the seat panel when not in use.

16. The method of claim 11, wherein the display device is rotatably mounted to the seat panel.

17. A vehicle seat panel for connecting a seat back entertainment system to a vehicle seat, comprising:
a rotatable hinge for connecting to a display device;
a cavity for housing a video unit for providing a video signal to the display device; and
one or more compartments formed in the seat panel,
wherein the cavity for housing the video unit is configured to accept a slot-loading optical disc drive that is oriented nearly vertically with respect to the seat panel,
wherein the display device is rotatable connected to the seat panel such that the display device flips out from a cavity in the seat panel into a viewing position and flips back into the cavity of the seat panel when not in the viewing position, and
wherein the slot-loading optical disc drive is located within the seat panel and below the cavity of the display device such that a loading slot of the slot-loading optical disc drive faces into the cavity of the display device so that the cavity of the display device forms a space for receiving an optical disc that has been ejected from the loading slot of the slot-loading optical disc drive when the display device is in the viewing position.

18. The vehicle seat panel of claim 17,
wherein the seat panel is shaped to accommodate a single make and model of vehicle, and
wherein the seat panel is shaped to directly connect to a structural frame of the vehicle seat after an original-equipment seat back panel has been removed from the vehicle seat.

* * * * *